United States Patent [19]

Takada

[11] Patent Number: 4,880,298
[45] Date of Patent: Nov. 14, 1989

[54] MICROSCOPE OBJECTIVE

[75] Inventor: Katsuhiro Takada, Tokyo, Japan

[73] Assignee: Olympus Optical Co., Ltd., Tokyo, Japan

[21] Appl. No.: 146,044

[22] Filed: Jan. 20, 1988

Related U.S. Application Data

[63] Continuation-in-part of Ser. No. 893,172, Aug. 5, 1986, abandoned.

[30] Foreign Application Priority Data

Aug. 7, 1985 [JP] Japan ................................ 60-173870

[51] Int. Cl.$^4$ ............................................. G02B 21/02
[52] U.S. Cl. ..................................... 350/414; 350/413
[58] Field of Search ................................ 350/413, 414

[56] References Cited

U.S. PATENT DOCUMENTS

| | | | |
|---|---|---|---|
| 3,912,378 | 10/1975 | Goto | 350/414 |
| 3,936,154 | 2/1976 | Fleishmann | 350/413 |
| 4,002,407 | 1/1977 | Maeda | 350/414 |
| 4,029,398 | 6/1977 | Koizumi | 350/414 |
| 4,077,704 | 3/1978 | Koizumi et al. | 350/414 |
| 4,215,914 | 8/1980 | Muchel et al. | 350/413 |
| 4,505,553 | 3/1985 | Asoma | 350/414 |
| 4,521,086 | 6/1985 | Kurita | 350/414 |
| 4,624,535 | 11/1986 | Kurihara et al. | 350/414 |
| 4,721,372 | 1/1988 | Yokota | 350/414 |
| 4,784,478 | 11/1988 | Takada | 350/413 |

FOREIGN PATENT DOCUMENTS 1942971  2/1970  Fed. Rep. of Germany ...... 350/413

OTHER PUBLICATIONS

Atkinson et al. "Design of a Gradient-Index Photographic Objective", Applied Optics, vol. 21, No. 6, 3-15-82, pp. 993-998.

Atkinson et al, "Gradient-Index Wide-Angle Photographic Objective Design", Applied Optics, vol. 23, No. 11, 6-1-84, pp. 1735-1741.

Meyer-Arendt, J. R., "Gradient-Index Lenses", Introduction to Classical and Modern Optics, 1972, pp. 362-365.

Primary Examiner—Bruce Y. Arnold
Assistant Examiner—Terry S. Callaghan
Attorney, Agent, or Firm—Cushman, Darby & Cushman

[57] ABSTRACT

A microscope objective lens system comprising a plurality of lenses, at least one of the lenses being a graded refractive index lens (GRIN lens) whose refractive index varies as the radial distance from the optical axis varies, which is simpler in construction and in which aberrations are corrected sufficiently to a wide range of NA.

50 Claims, 12 Drawing Sheets

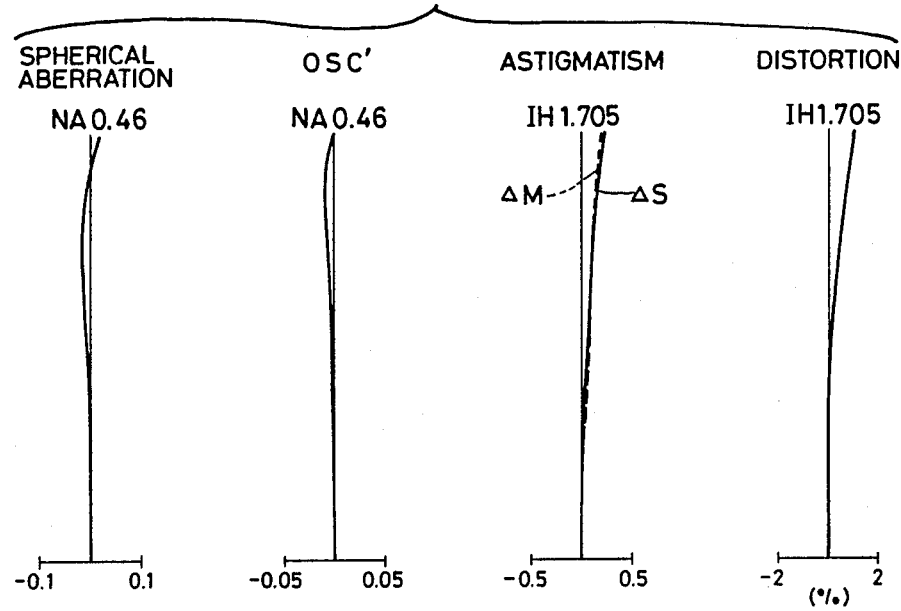
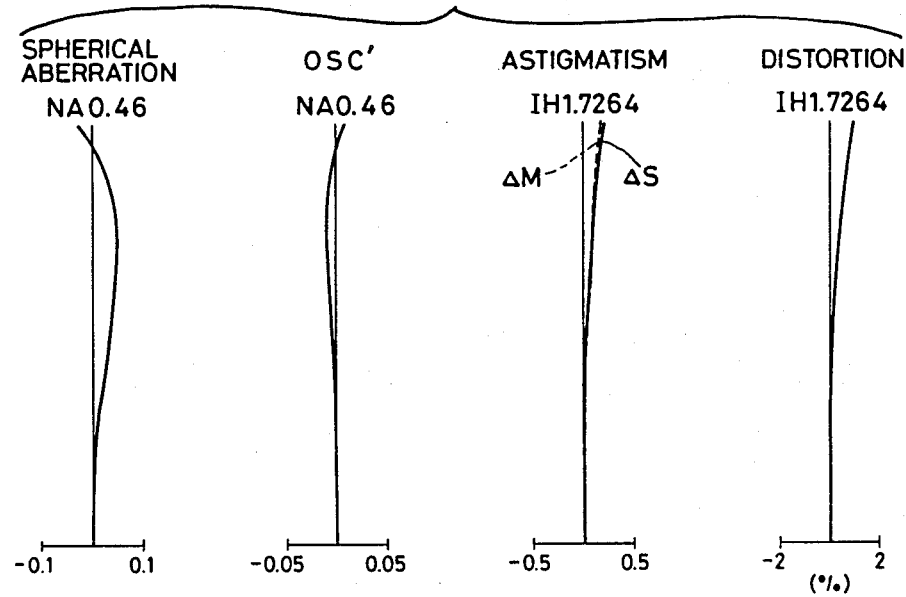

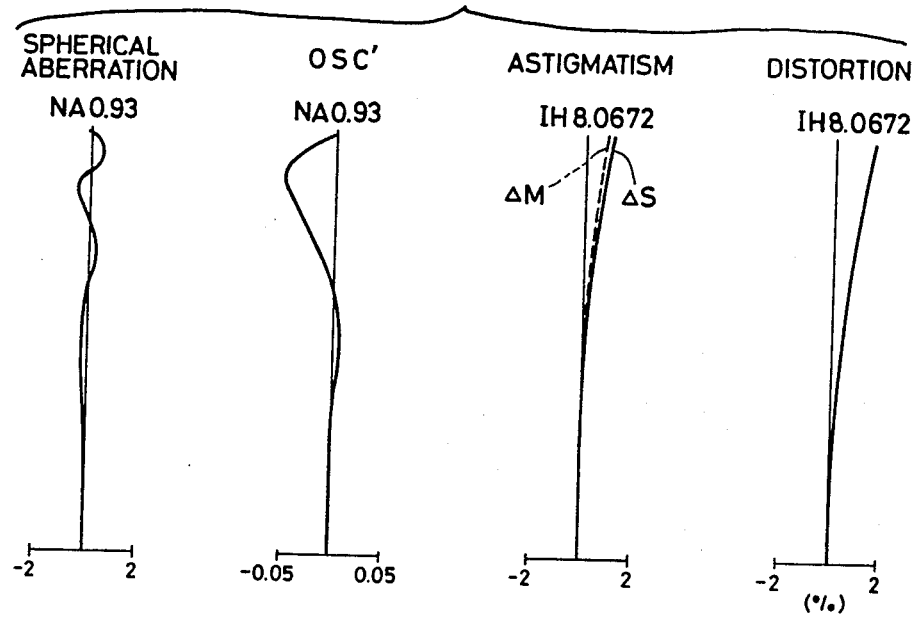
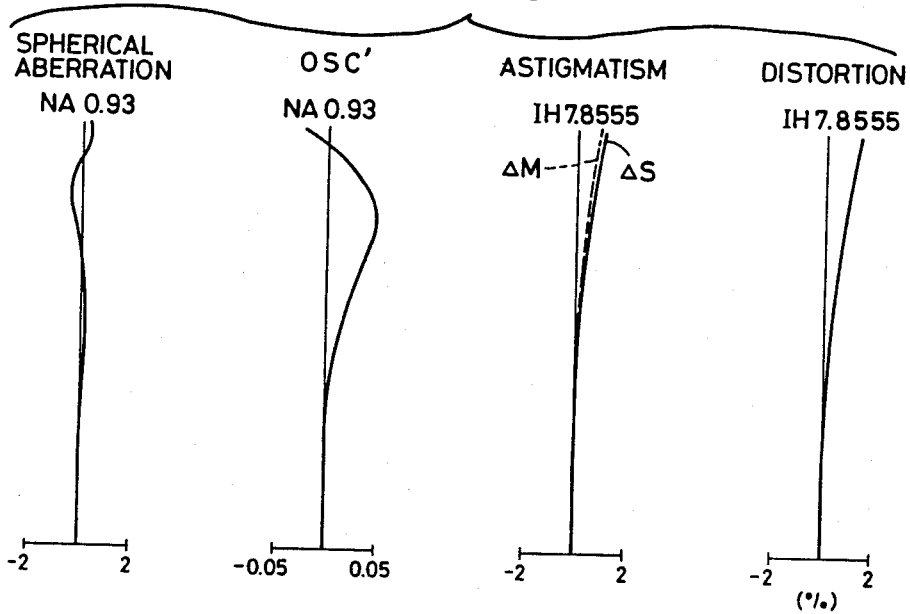

MICROSCOPE OBJECTIVE

This is a continuation-in-part applicaton of Ser. No. 893,172 filed Aug. 5, 1986, which was abandoned upon the filing hereof.

BACKGROUND OF THE INVENTION (a) Field of the Invention

The present invention relates to a microscope objective lens system.

(b) Description of the Prior Art

It is necessary that various aberrations be sufficiently well-corrected in a microscope objective lens system. But, at the same time, it is necessary to satisfy the requirements which limit the freedom of the correction of aberrations. For example, in order to obtain high resolution power, it is necessary for the numerical aperture (NA) to be large. In order to avoid a damaging contact between an object and an objective lens system, it is necessary for the working distance (WD) to be large. In order to set the various kinds of objective lens systems on the same revolver and to change them for use, it is necessary for a total length of the lens system to be within predetermined limits. Moreover, in order to keep the optical tube length constant, it is necessary for the distance between the rear focal point of an objective lens system and the image surface to be constant independently of magnification.

It is very difficult to correct various aberrations sufficiently given these various limitations plus the limitation that the objective lens system is a magnifying system.

In order to overcome these difficulties, the conventional microscope objective lens system cannot but be an extremely complicated optical system which comprises a number of lenses having strong curvatures.

In order to simplify construction, there have been developed microscope objective lens systems in which aspherical lenses or graded refractive index lenses (GRIN lenses) are introduced. The examples where a GRIN lens is applied to a microscope objective lens system are disclosed in Japanese Published Examined Patent Application Nos. 28057/72 and 37405/82. The former only discloses the use of a GRIN lens in the image-forming system of a microscope, but does not disclose anything related to the correction of aberrations. On the other hand, in the latter, a GRIN lens whose refractive index is expressed by the exponential function as described below is arranged, in the optical system of a microscope, at the position where the height of the axial marginal ray is smaller than that of the off-axial ray, so that off-axial aberrations are corrected.

$$n = n_0 e^{kr}$$

where $n_0$ represents the refractive index at the center of the lens, k is the parameter representing the gradient of the refractive index and r represents the radial distance from the optical axis.

In the case that the refractive index varies in accordance with the above-mentioned function, it varies extraordinarily where r is large. Therefore, when the above-mentioned GRIN lens is arranged at the above-mentioned position, it will be possible to correct only off-axial aberrations without any influence on axial aberration.

In a usual microscope objective lens system, however, when NA becomes large, axial light bundle and off-axial light bundle propagate almost overlappingly so that the position where both the bundles separate from each other is quite close to the image-forming position. In the conventional construction, therefore, it is necessary to set a GRIN lens separately and behind an objective lens. However, the position through which a ray passes is different in each objective lens system, so that when various kinds of objective lens systems are changed while the GRIN lens is fixed, it will be impossible to always well-correct aberrations.

SUMMARY OF THE INVENTION

It is a primary object of the present invention to provide a microscope objective lens system which comprises, as a constructional element, a graded refractive index lens (GRIN lens) whose refractive index varies as the radial distance from the optical axis varies and in which NA is large though various aberrations are corrected favorably.

It is necessary that in a microscope objective lens system spherical aberration, coma, curvature of field and astigmatism etc. are corrected sufficiently. Once the power distribution is determined in order to correct curvature of field among these various aberrations, the limitations for the other aberrations will become severe, so that it will become difficult to correct all the aberrations favorably.

With an objective lens system which is divided into a front group which mainly contributes to the enlargement of magnification or in which entrance NA and exit NA are different largely from each other, and a rear group which relays the exit ray from the front group to the predetermined image-forming position (including ∞), in order to correct all of above-mentioned various aberrations sufficiently, it is necessary for the front group to have a correction of curvature of field as well as suppression of the generation of spherical aberration and coma, and to have a strong refracting power.

In order to minimize spherical aberration, etc. to be produced in the front group, however, it is desirable to adopt an aplanatic lens composition for the front group. In order to flatten the image surface, on the other hand, the objective lens system must satisfy Petzval's condition, thereby making it necessary to modify to certain degrees the aplanatic composition for the front group. In such a case, spherical aberration, etc. will remain in the front group.

As a method to solve this problem, it is effective to arrange a radial GRIN lens in the front group.

Petzval's sum of a radial GRIN lens PS is expressed by the following formula:

$$PS = \Sigma \phi s / n_0 + \phi G / n_0^2$$

wherein the reference symbols are defined as follows:
- $\phi s$: refracting power on the radial GRIN lens surfaces
- $\phi G$: refracting power of the radial GRIN lens medium
- $n_0$: refractive index on the optical axis of the radial GRIN lens As is understood from the above-mentioned formula, Petzval's sum PS is little dependent on the refracting power of medium $\phi G$. Therefore, Petzval's sum can easily be satisfied by arranging a radial GRIN lens in the front group while maintaining an aplanatic composition of the front group.

As another method to solve the above-mentioned problem, it is conceivable to adopt a radial GRIN lens in the rear group to enhance aberration correcting function of the rear group.

The rays emitted from an object are gradually diverged while changing NA in the front group. Therefore, the off-axial upper ray and lower ray are farther apart from each other as they are farther from the object, and remarkable asymmetrical aberration is produced in the front group. This aberration can be corrected by arranging a radial GRIN lens in the rear group. Further, in the objective lens system having a large NA, the paraxial ray is widerly diverged also in the rear group and broadly overlapped with the off-axial ray. Therefore, the paraxial aberration can also be corrected by a radial GRIN lens arranged in the rear group.

By applying both the methods described above, i.e., adopting radial GRIN lenses in both the front and rear groups, it is possible to obtain a higher effect as a multiplicative effect of both the methods or design a microscope objective lens system in which aberrations are corrected more favorably.

In the foregoing descriptions, the front and rear groups are divided depending on magnification levels. In the widely used microscope objective lens systems such as Amici type and Petzval's type, however, it is possible to regard the intersection between the off-axial principal ray and the optical axis as the dividing point, i.e., to regard the lens group located on the object side from the intersection as a frong group and the lens group located on the image side as a rear group.

The so-called plan objective lens system for which flatness of the image surface is strongly demanded is mostly designed as a lens system comprising a meniscus lens having a strongly concave surface on the extreme object side or a Gauss type in order to correct curvature of field.

The lens system comprising a meniscus lens on the extreme object side is preferable for correction of aberration but does not permit prolonging the working distance. It is therefore desirable to select a plane surface in place of the concave surface. When selecting such a plane surface, however, refractive power is generally too strong to correct Petzval's sum. When this lens is replaced with a radial GRIN lens having negative refracting power, it is possible to maintain flatness of the image surface owning to the Petzval's term ($\phi G/n_0^2$) of medium even if the surface on the entrance side is plane.

In a case where the Gauss type is adopted for the microscope objective lens system according to the present invention, on the other hand, a concave surface is arranged at a location apart from the surface on the extreme object side and the surface arranged on the extreme object side is not a concave surface having strong curvature. Therefore, the Gauss type of objective lens system permits reserving a relatively long working distance. Taking workability, etc. into consideration, however, it is desirable to select a plane surface on the extreme object side.

When a plane surface is arranged on the extreme object side, the composition of the lens system deviates from the aplanatic composition, thereby aggravating spherical aberration and degrading balance of aberrations. In order to correct this spherical aberration, it is effective to arrange a radial GRIN lens on the rear side of the lens component arranged on the extreme object side. A very high effect is obtained for correcting spherical aberration especially by adopting a radial GRIN lens as a lens component having a function to diverge the converged paraxial ray.

In a case where a radial GRIN lens having a plane surface on the object side is arranged on the extreme object side, too high a refractive index gradient of the GRIN lens is favorable for correction of Petzval's sum but allows positive spherical aberration to be producted. Accordingly, it is possible to obtain a microscope objective lens system having a simple composition and correcting aberrations with good balance by arranging a radial GRIN lens at a location, on the image side of the above-mentioned lens component arranged on the extreme object side, in the vicinity of widest divergence point of the paraxial ray or on the image side thereof.

In the Embodiments described later, the following GRIN lens is used. That is, the refractive index distribution is expressed by the following formula wherein the refractive index on the optical axis is given by $n_0$ and the radial distance from the optical axis is given by r.

$$n = n_0 + n_1 r^2 + n_2 r^4 + n_3 r^6 + \ldots$$

where $n_1, n_2, n_3, \ldots$ respectively represent the 2nd-, 4th-, 6th-, ... order coefficients.

In order to have a GRIN lens possess the full power of the correction of aberrations, when a GRIN lens is arranged in the front group, it will be desirable to satisfy the following condition (1):

$$|n_1| > 7 \times 10^{-4}/f^2 \tag{1}$$

When a GRIN lens is arranged in the rear group, it will be desirable to satisfy the following condition (2):

$$|n_1| > 1 \times 10^{-4}/f^2 \tag{2}$$

If the conditions (1) or (2) are not satisfied, the difference between the refractive index at the center and that at the periphery will become too small, and it will be difficult to correct aberrations sufficiently.

If the variation of the high-order refractive index becomes too large, it will become difficult to keep the balance between the aberration by the ray passing near the optical axis and that by the ray passing through the periphery of the lens. In order to avoid this, it will be desirable to satisfy the following conditon (3) wherein $\bar{n}_i$ represents the value of each order coefficient $n_i$ normalized by the focal length of the total system or $\bar{n}_i = (-n_i/f^{2i})$:

$$|\bar{n}_1| > |\bar{n}_i|, i \geq 3 \tag{3}$$

Especially, it will be desirable to make the difference no less than one or two orders between the 2nd-order coefficient and each of the higher-order coefficient in order to correct aberrations with good balance.

BRIEF DESCRIPTION OF THE DRAWINGS

FIGS. 15 through 28 show graphs illustrating aberration curves of Embodiments 1 through 14 of the microscope objective lens system according to the present invention.

DETAILED DESCRIPTION OF THE PREFFERED EMBODIMENTS

Figure 1:
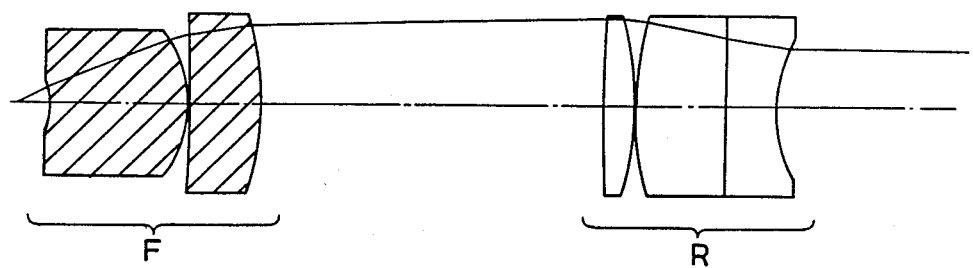
FIGS. 1 through 14 respectively show the lens constructions of Embodiments 1 through 14 of the microscope objective lens system according to the present invention.

Preferred Embodiments of the microscope objective lens system according to the present invention are shown below:

Embodiment 1

$r_1 = -0.6144$
$r_2 = -0.9063$
$r_3 = -11.8711$
$r_4 = -1.9559$
$r_5 = 14.2613$
$r_6 = -2.8644$
$r_7 = 2.5836$
$r_8 = \infty$
$r_9 = 1.1081$ $d_1 = 1.0054$, $n_{01} = 1.78590^*$
$d_2 = 0.0129$
$d_3 = 0.5453$, $n_{02} = 1.76180^*$
$d_4 = 2.5506$
$d_5 = 0.2171$, $n_{03} = 1.49700$
$d_6 = 0.0129$
$d_7 = 0.6761$, $n_{04} = 1.65830$
$d_8 = 0.3728$, $n_{05} = 1.61340$

|  | $n_1$ | $n_2$ |
|---|---|---|
| the 1st lens | 0.16838 | $0.60574 \times 10^{-1}$ |
| the 2nd lens | $-0.13761$ | $-0.54513 \times 10^{-2}$ |

$f = 1$, $WD = 0.2456$
$m = 20x$, $NA = 0.46$

Embodiment 2

$r_1 = -0.7070$
$r_2 = -0.9457$
$r_3 = -7.5963$
$r_4 = -1.7635$
$r_5 = 7.1126$
$r_6 = -2.7181$
$r_7 = 2.7615$
$r_8 = 1.0582$ $d_1 = 1.0402$, $n_{01} = 1.78590^*$
$d_2 = 0.0130$
$d_3 = 0.5582$, $n_{02} = 1.76180^*$
$d_4 = 2.2760$
$d_5 = 0.4596$, $n_{03} = 1.49700$
$d_6 = 0.0130$
$d_7 = 1.1005$, $n_{04} = 1.65830$

|  | $n_1$ | $n_2$ |
|---|---|---|
| the 1st lens | 0.28629 | 0.10903 |
| the 2nd lens | $-0.18390$ | $-0.78497 \times 10^{-2}$ |

$f = 1$, $WD = 0.2486$
$m = 20x$, $NA = 0.46$

Embodiment 3

$r_1 = -0.4538$
$r_2 = -0.7384$
$r_3 = -2.2225$
$r_4 = -1.1462$
$r_5 = -50.2670$
$r_6 = -3.5196$
$r_7 = 3.5395$
$r_8 = -4.1378$
$r_9 = 1.9530$
$r_{10} = 0.9857$ $d_1 = 0.6875$, $n_{01} = 1.83400$
$d_2 = 0.0128$
$d_3 = 0.2726$, $n_{02} = 1.49700$
$d_4 = 0.0128$
$d_5 = 0.6930$, $n_{03} = 1.76180$
$d_6 = 2.4305$
$d_7 = 0.3499$, $n_{04} = 1.49700$
$d_8 = 0.0128$
$d_9 = 0.8743$, $n_{05} = 1.65830^*$

|  | $n_1$ | $n_2$ |
|---|---|---|
| the 5th lens | $-0.14689 \times 10^{-2}$ | $-0.60052 \times 10^{-3}$ |

$f = 1$, $WD = 0.2434$
$m = 20x$, $NA = 0.46$

Embodiment 4

$r_1 = -0.4496$
$r_2 = -0.7511$
$r_3 = -2.6794$
$r_4 = -1.0686$
$r_5 = -39.6904$
$r_6 = -4.0568$
$r_7 = 4.1051$
$r_8 = -4.6364$
$r_9 = 1.9945$
$r_{10} = 0.9754$ $d_1 = 0.6812$, $n_{01} = 1.83400$
$d_2 = 0.0127$
$d_3 = 0.2542$, $n_{02} = 1.49700$
$d_4 = 0.0127$
$d_5 = 0.6420$, $n_{03} = 1.76180$
$d_6 = 1.4876$
$d_7 = 0.3941$, $n_{04} = 1.60178^*$
$d_8 = 0.0127$
$d_9 = 0.8333$, $n_{05} = 1.66083^*$

|  | $n_1$ | $n_2$ |
|---|---|---|
| the 4th lens | $-0.36453 \times 10^{-1}$ | $0.98488 \times 10^{-2}$ |
| the 5th lens | $0.13955 \times 10^{-1}$ | $-0.25987 \times 10^{-1}$ |

$f = 1$, $WD = 0.2427$
$m = 20x$, $NA = 0.46$

Embodiment 5

$r_1 = -0.6202$
$r_2 = -0.9334$
$r_3 = -25.9860$
$r_4 = -1.8355$
$r_5 = 17.0878$
$r_6 = -2.8475$
$r_7 = 2.3126$
$r_8 = 1.3126$ $d_1 = 1.0101$, $n_{01} = 1.78590^*$
$d_2 = 0.0129$
$d_3 = 0.5460$, $n_{02} = 1.76180^*$
$d_4 = 2.5837$
$d_5 = 0.2177$, $n_{03} = 1.49700$
$d_6 = 0.0129$
$d_7 = 1.0278$, $n_{04} = 1.65830^*$

|  | $n_1$ | $n_2$ |
|---|---|---|
| the 1st lens | 0.20954 | $0.55868 \times 10^{-1}$ |
| the 2nd lens | $-0.12844$ | $0.81108 \times 10^{-2}$ |
| the 4th lens | $0.18233 \times 10^{-2}$ | $0.56092 \times 10^{-3}$ |

$f = 1$, $WD = 0.2464$
$m = 20x$, $NA = 0.46$

Embodiment 6

$r_1 = -0.6082$
$r_2 = -0.9962$
$r_3 = 4.5931$
$r_4 = -2.1599$
$r_5 = 5.1919$
$r_6 = 1.5327$ $d_1 = 0.9974$, $n_{01} = 1.77250^*$
$d_2 = 0.0127$
$d_3 = 0.5346$, $n_{02} = 1.77250^*$
$d_4 = 2.6874$
$d_5 = 1.0629$, $n_{03} = 1.83400^*$

|  | $n_1$ | $n_2$ |
|---|---|---|
| the 1st lens | 0.15622 | $0.27687 \times 10^{-1}$ |
| the 2nd lens | $-0.93618 \times 10^{-1}$ | $0.19220 \times 10^{-1}$ |
| the 3rd lens | $-0.16188$ | $0.32660 \times 10^{-1}$ |

$f = 1$, $WD = 0.2417$
$m = 20x$, $NA = 0.46$

Embodiment 7

$r_1 = -0.5249$
$r_2 = -1.0014$
$r_3 = 4.7627$
$r_4 = -2.2014$ $d_1 = 0.9910$, $n_{01} = 1.77250$
$d_2 = 0.0124$
$d_3 = 0.5335$, $n_{02} = 1.77250^*$
$d_4 = 2.6257$

-continued

| | | | |
|---|---|---|---|
| $r_5 = -23.3838$ | | | |
| | $d_5 = 1.0309$ | | $n_{03} = 1.83400*$ |
| $r_6 = 3.3579$ | | | |

| | $n_1$ | $n_2$ |
|---|---|---|
| the 2nd lens | $-0.55298 \times 10^{-1}$ | $-0.63272 \times 10^{-2}$ |
| the 3rd lens | $-0.13406$ | $0.43943 \times 10^{-1}$ |

$f = 1$      WD = 0.2371
$m = 20 \times$      NA = 0.46

Embodiment 8

| | | | |
|---|---|---|---|
| $r_1 = \infty$ | | | |
| | $d_1 = 0.8889$ | | $n_{01} = 1.63980*$ |
| $r_2 = -7.4105$ | | | |
| | $d_2 = 0.0131$ | | |
| $r_3 = 1713.8486$ | | | |
| | $d_3 = 0.2502$ | | $n_{02} = 1.49700$ |
| $r_4 = -1.7788$ | | | |
| | $d_4 = 0.5388$ | | $n_{03} = 1.79952*$ |
| $r_5 = -1.3234$ | | | |
| | $d_5 = 0.0131$ | | |
| $r_6 = 24.5284$ | | | |
| | $d_6 = 0.4578$ | | $n_{04} = 1.67000*$ |
| $r_7 = -3.7949$ | | | |
| | $d_7 = 1.9044$ | | |
| $r_8 = 2.6069$ | | | |
| | $d_8 = 0.6026$ | | $n_{05} = 1.65830*$ |
| $r_9 = \infty$ | | | |
| | $d_9 = 0.6903$ | | $n_{06} = 1.61293*$ |
| $r_{10} = 0.6670$ | | | |

| | $n_1$ | $n_2$ |
|---|---|---|
| the 1st lens | 0.56264 | $-0.51213$ |
| the 3rd lens | $-0.11046$ | $0.37325 \times 10^{-1}$ |
| the 4th lens | $-0.12854$ | $-0.73600 \times 10^{-1}$ |
| the 5th lens | $-0.25773$ | $-0.72271 \times 10^{-1}$ |
| the 6th lens | $0.16576 \times 10^{-2}$ | $-0.12224$ |

$f = 1$      WD = 0.2496
$m = 20 \times$      NA = 0.46

Embodiment 9

| | | | |
|---|---|---|---|
| $r_1 = \infty$ | | | |
| | $d_1 = 0.5027$ | | $n_{01} = 1.83400*$ |
| $r_2 = -0.7363$ | | | |
| | $d_2 = 0.0125$ | | |
| $r_3 = 0.5038$ | | | |
| | $d_3 = 0.2311$ | | $n_{02} = 1.49700$ |
| $r_4 = \infty$ | | | |
| | $d_4 = 0.1868$ | | $n_{03} = 1.74000*$ |
| $r_5 = 0.3873$ | | | |
| | $d_5 = 0.2353$ | | |
| $r_6 = -0.3567$ | | | |
| | $d_6 = 0.1005$ | | $n_{04} = 1.67270*$ |
| $r_7 = \infty$ | | | |
| | $d_7 = 0.4094$ | | $n_{05} = 1.49700*$ |
| $r_8 = -0.7164$ | | | |
| | $d_8 = 0.0184$ | | |
| $r_9 = 4.7830$ | | | |
| | $d_9 = 0.3580$ | | $n_{06} = 1.66755*$ |
| $r_{10} = -1.2326$ | | | |
| | $d_{10} = 1.5374$ | | |
| $r_{11} = 1.0611$ | | | |
| | $d_{11} = 0.6214$ | | $n_{07} = 1.54869$ |
| $r_{12} = 0.7628$ | | | |

| | $n_1$ | $n_2$ |
|---|---|---|
| the 1st lens | $-0.24460$ | $-0.25363$ |
| the 3rd lens | $0.36245 \times 10^{-1}$ | $0.48691$ |
| the 4th lens | $0.92425 \times 10^{-1}$ | $0.63217$ |
| the 5th lens | $0.10171$ | $0.75023 \times 10^{-1}$ |
| the 6th lens | $-0.58875 \times 10^{-1}$ | $-0.22649 \times 10^{-2}$ |

$f = 1$      WD = 0.4513
$m = 20 \times$      NA = 0.46

Embodiment 10

| | | | |
|---|---|---|---|
| $r_1 = -0.8938$ | | | |
| | $d_1 = 1.3014$ | | $n_{01} = 1.60311*$ |
| $r_2 = -1.0761$ | | | |
| | $d_2 = 0.0485$ | | |
| $r_3 = -12.5422$ | | | |
| | $d_3 = 1.2779$ | | $n_{02} = 1.49700*$ |
| $r_4 = -2.1073$ | | | |
| | $d_4 = 0.1196$ | | |
| $r_5 = -5.9203$ | | | |
| | $d_5 = 4.0147$ | | $n_{03} = 1.65830*$ |
| $r_6 = -15.8260$ | | | |
| | $d_6 = 2.4285$ | | |
| $r_7 = 50.5226$ | | | |
| | $d_7 = 1.2080$ | | $n_{04} = 1.69680$ |
| $r_8 = -45.6551$ | | | |
| | $d_8 = 0.8486$ | | |
| $r_9 = 8.8504$ | | | |
| | $d_9 = 3.9661$ | | $n_{05} = 1.64769*$ |
| $r_{10} = 8.1084$ | | | |
| | $d_{10} = 0.0901$ | | |
| $r_{11} = 5.3751$ | | | |
| | $d_{11} = 3.3167$ | | $n_{06} = 1.69680*$ |
| $r_{12} = 1.8122$ | | | |

| | $n_1$ | $n_2$ |
|---|---|---|
| the 1st lens | $-0.55383 \times 10^{-1}$ | $0.75335 \times 10^{-2}$ |
| the 2nd lens | $0.36158 \times 10^{-2}$ | $-0.67351 \times 10^{-2}$ |
| the 3rd lens | $-0.48852 \times 10^{-2}$ | $0.58867 \times 10^{-3}$ |
| the 5th lens | $-0.91403 \times 10^{-2}$ | $0.61851 \times 10^{-4}$ |
| the 6th lens | $0.29971 \times 10^{-2}$ | $-0.79363 \times 10^{-3}$ |

$f = 1$      WD = 0.2747
$m = 100 \times$      NA = 0.93

Embodiment 11

| | | | |
|---|---|---|---|
| $r_1 = -0.9046$ | | | |
| | $d_1 = 1.3174$ | | $n_{01} = 1.60311*$ |
| $r_2 = -1.0892$ | | | |
| | $d_2 = 0.0490$ | | |
| $r_3 = -14.5015$ | | | |
| | $d_3 = 1.2957$ | | $n_{02} = 1.49700*$ |
| $r_4 = -2.1711$ | | | |
| | $d_4 = 0.1210$ | | |
| $r_5 = -9.4617$ | | | |
| | $d_5 = 4.1552$ | | $n_{03} = 1.65830*$ |
| $r_6 = -74.3330$ | | | |
| | $d_6 = 2.6622$ | | |
| $r_7 = 14.4729$ | | | |
| | $d_7 = 1.2227$ | | $n_{04} = 1.69680$ |
| $r_8 = 76.2347$ | | | |
| | $d_8 = 1.4766$ | | |
| $r_9 = 7.4458$ | | | |
| | $d_9 = 4.4476$ | | $n_{05} = 1.64769*$ |
| $r_{10} = 5.3166$ | | | |
| | $d_{10} = 0.0912$ | | |
| $r_{11} = 4.1294$ | | | |
| | $d_{11} = 3.4526$ | | $n_{06} = 1.69680$ |
| $r_{12} = 1.8342$ | | | |

| | $n_1$ | $n_2$ |
|---|---|---|
| the 1st lens | $-0.44747 \times 10^{-1}$ | $0.62120 \times 10^{-2}$ |
| the 2nd lens | $0.46213 \times 10^{-2}$ | $-0.63046 \times 10^{-2}$ |
| the 3rd lens | $-0.37359 \times 10^{-2}$ | $0.78555 \times 10^{-3}$ |
| the 5th lens | $-0.52911 \times 10^{-2}$ | $-0.54567 \times 10^{-4}$ |

$f = 1$      WD = 0.2780
$m = 100 \times$      NA = 0.93

Embodiment 12

| | | | |
|---|---|---|---|
| $r_1 = -0.9096$ | | | |
| | $d_1 = 1.3245$ | | $n_{01} = 1.60075*$ |
| $r_2 = -1.0952$ | | | |
| | $d_2 = 0.0493$ | | |
| $r_3 = -14.1908$ | | | |
| | $d_3 = 1.3024$ | | $n_{02} = 1.49816*$ |
| $r_4 = -2.1963$ | | | |
| | $d_4 = 0.1217$ | | |
| $r_5 = -10.1842$ | | | |
| | $d_5 = 4.1444$ | | $n_{03} = 1.80715*$ |
| $r_6 = -39.8009$ | | | |
| | $d_6 = 6.9678$ | | |
| $r_7 = 6.1099$ | | | |
| | $d_7 = 4.05878$ | | $n_{04} = 1.69783*$ |
| $r_8 = 8.5336$ | | | |
| | $d_8 = 3.4046$ | | $n_{05} = 1.72825$ |
| $r_9 = 2.0713$ | | | |

| | $n_1$ | $n_2$ |
|---|---|---|
| the 1st lens | $-0.45357 \times 10^{-1}$ | $0.60265 \times 10^{-2}$ |
| the 2nd lens | $0.45552 \times 10^{-2}$ | $-0.58051 \times 10^{-2}$ |

-continued

| | | |
|---|---|---|
| the 3rd lens | $-0.78030 \times 10^{-2}$ | $0.68623 \times 10^{-3}$ |
| the 4th lens | $-0.69381 \times 10^{-2}$ | $-0.72030 \times 10^{-4}$ |

| | |
|---|---|
| f = 1 | WD = 0.2795 |
| m = 100 x | NA = 0.93 |

Embodiment 13

| | | |
|---|---|---|
| $r_1 = -0.9102$ | | |
| | $d_1 = 1.3253$ | $n_{01} = 1.60023^*$ |
| $r_2 = -1.0959$ | | |
| | $d_2 = 0.0493$ | |
| $r_3 = -14.9113$ | | |
| | $d_3 = 1.3034$ | $n_{02} = 1.49944^*$ |
| $r_4 = -2.2018$ | | |
| | $d_4 = 0.1218$ | |
| $r_5 = -9.1663$ | | |
| | $d_5 = 4.2035$ | $n_{03} = 1.85239^*$ |
| $r_6 = -30.0889$ | | |
| | $d_6 = 6.8824$ | |
| $r_7 = 5.4337$ | | |
| | $d_7 = 4.0753$ | $n_{04} = 1.53018^*$ |
| $r_8 = 5.8757$ | | |
| | $d_8 = 3.4069$ | $n_{05} = 1.72825$ |
| $r_9 = 1.9552$ | | |

| | $n_1$ | $n_2$ |
|---|---|---|
| the 1st lens | $-0.43188 \times 10^{-1}$ | $0.56817 \times 10^{-2}$ |
| the 2nd lens | $0.49284 \times 10^{-2}$ | $-0.58945 \times 10^{-2}$ |
| the 3rd lens | $-0.82238 \times 10^{-2}$ | $0.69973 \times 10^{-3}$ |
| the 4th lens | $-0.69388 \times 10^{-2}$ | $-0.79032 \times 10^{-4}$ |

| | |
|---|---|
| f = 1 | WD = 0.2797 |
| m = 100 x | NA = 0.93 |

Embodiment 14

| | | |
|---|---|---|
| $r_1 = -1.0065$ | | |
| | $d_1 = 1.2888$ | $n_{01} = 1.70154$ |
| $r_2 = -1.1460$ | | |
| | $d_2 = 0.0480$ | |
| $r_3 = 42.7198$ | | |
| | $d_3 = 1.2684$ | $n_{02} = 1.49944^*$ |
| $r_4 = -2.2385$ | | |
| | $d_4 = 0.1186$ | |
| $r_5 = -7.2241$ | | |
| | $d_5 = 4.1668$ | $n_{03} = 1.85239^*$ |
| $r_6 = -21.1737$ | | |
| | $d_6 = 3.4460$ | |
| $r_7 = 4.2290$ | | |
| | $d_7 = 3.9676$ | $n_{04} = 1.53018^*$ |
| $r_8 = -11.4298$ | | |
| | $d_8 = 3.3015$ | $n_{05} = 1.57309$ |
| $r_9 = 1.6647$ | | |

| | $n_1$ | $n_2$ |
|---|---|---|
| the 2nd lens | $-0.24757 \times 10^{-2}$ | $-0.52109 \times 10^{-2}$ |
| the 3rd lens | $-0.51876 \times 10^{-2}$ | $0.11213 \times 10^{-2}$ |
| the 4th lens | $-0.78173 \times 10^{-2}$ | $-0.25718 \times 10^{-3}$ |

| | |
|---|---|
| f = 1 | WD = 0.2724 |
| m = 100 x | NA = 0.93 |

In the above-mentioned Embodiments of the microscope objective lens system according to the present invention, $r_1, r_2, \ldots$ respectively represent the radii of curvature of respective lens surfaces, $d_1, d_2, \ldots$ respectively represent the thickness of respective lenses and the air-spaces between respective lenses, $n_{01}, n_{02}, \ldots$ respectively represent the refractive indices of respective lenses, or the refractive indices on the optical axis when the lenses are GRIN lenses and in this case an asterisk * is given, $n_1$ and $n_2$ respectively represent the 2nd- and 4th-order coefficients, f represents the focal length of the total system, WD represents the working distance, m represents the magnification, and NA represents the numerical aperture.

In respective Embodiments of the microscope objective lens system according to the present invention, the 6th- and higher-order coefficients are zero.

Figure 2:
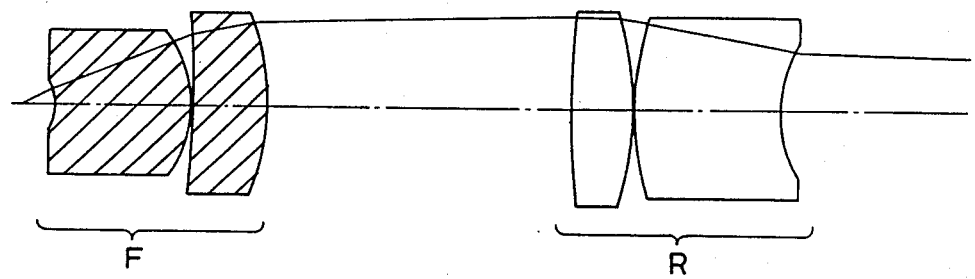
Figure 3:
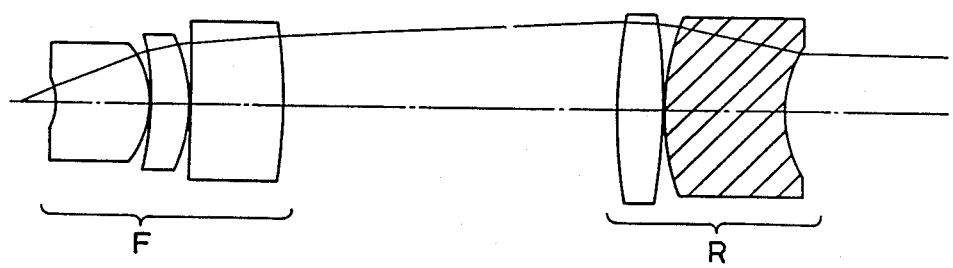
Figure 4:
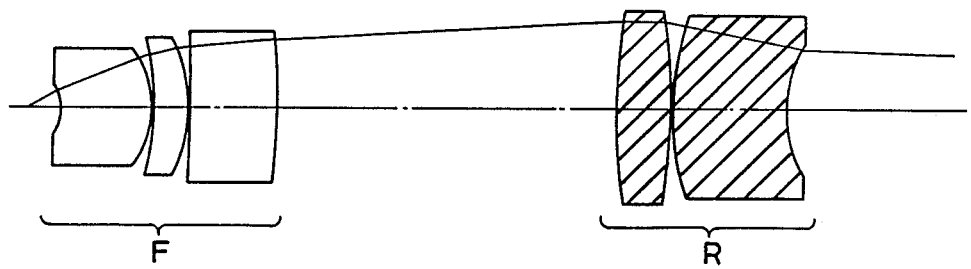
Figure 5:
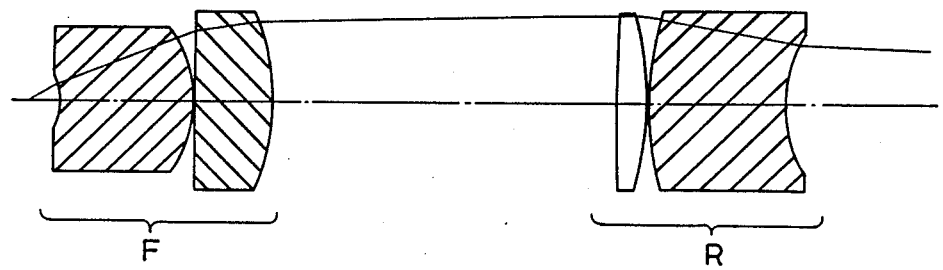
Figure 6:
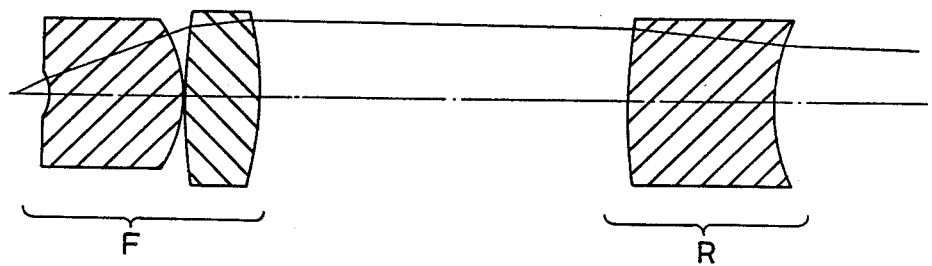
Figure 7:
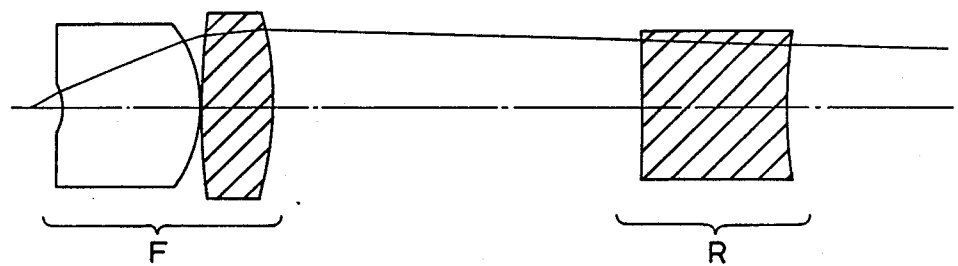
Figure 8:
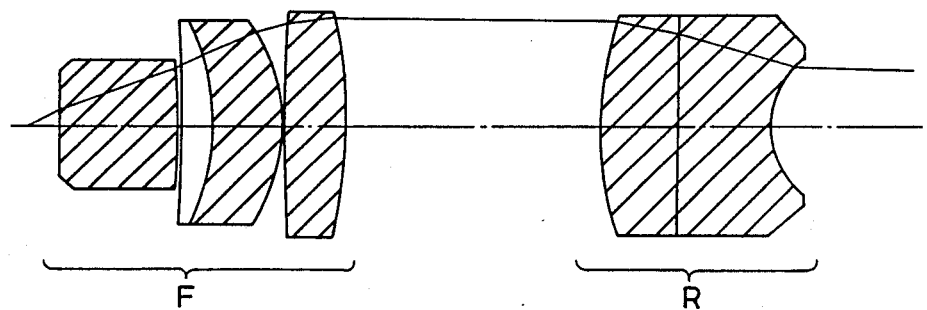
Figure 9:
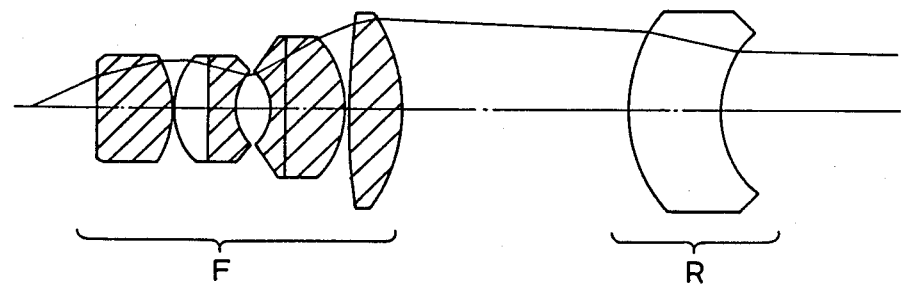
Figure 10:
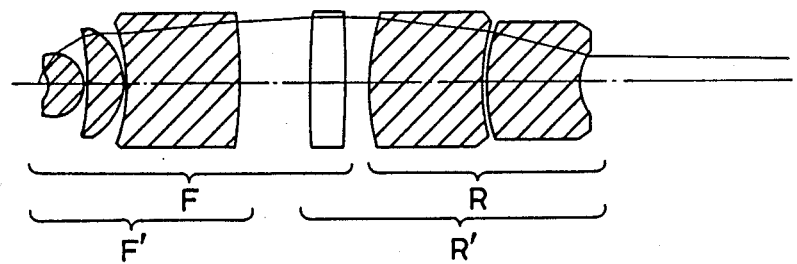
Figure 11:
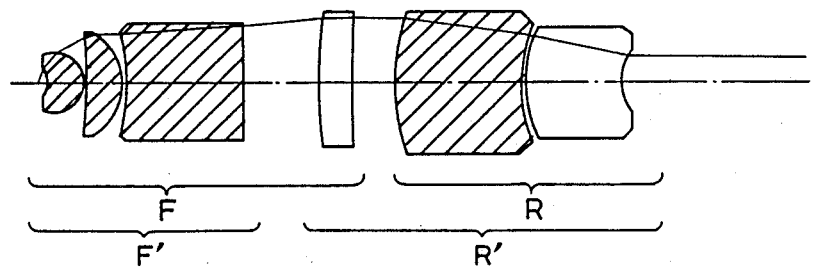
Figure 12:
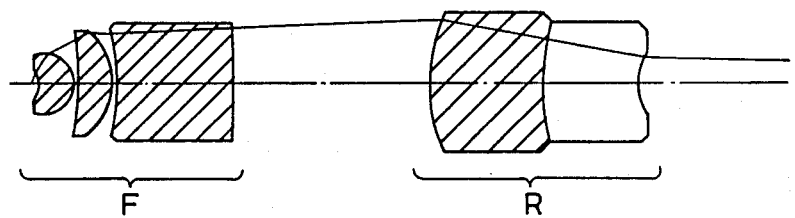
Figure 13:
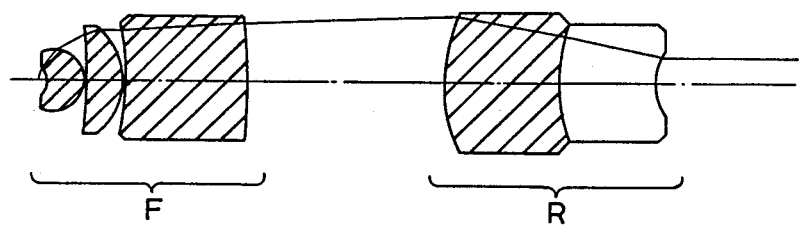
Figure 14:
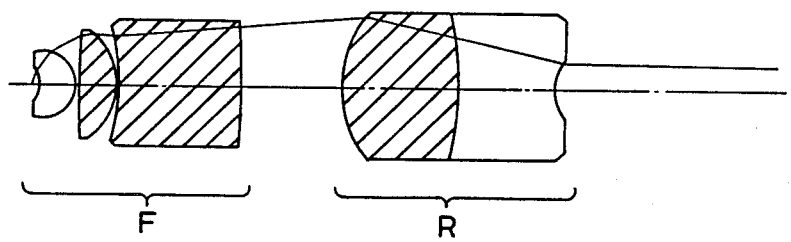
Figure 17:
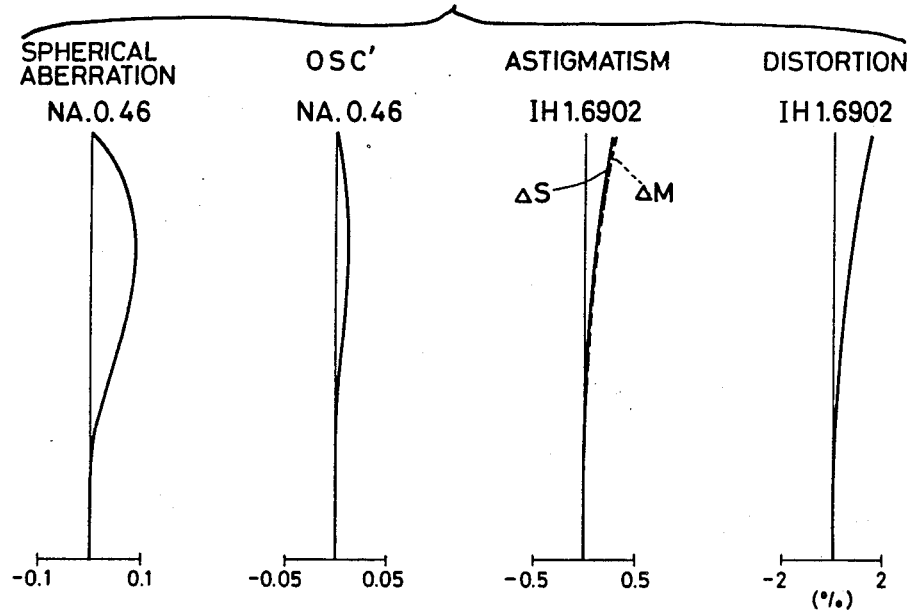
Figure 18:
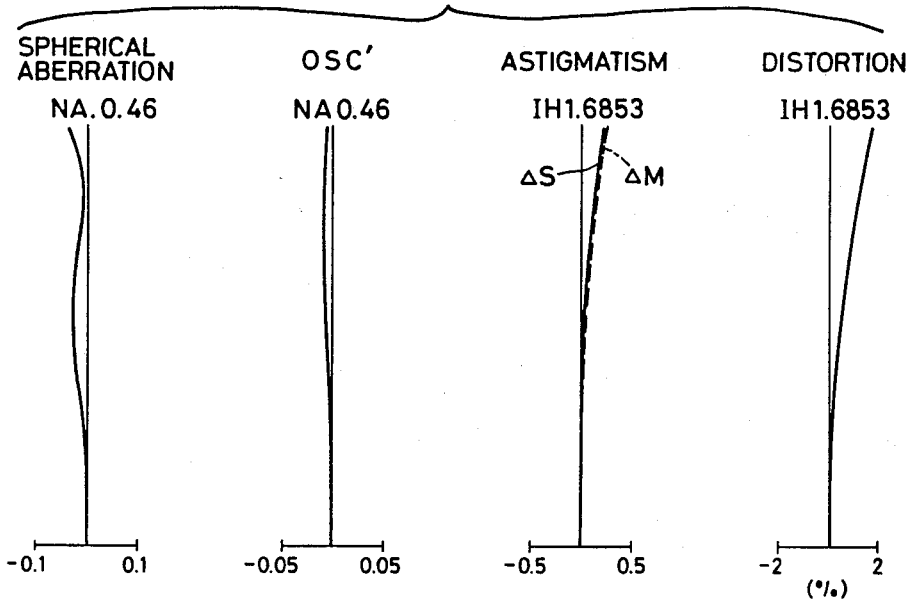
Figure 19:
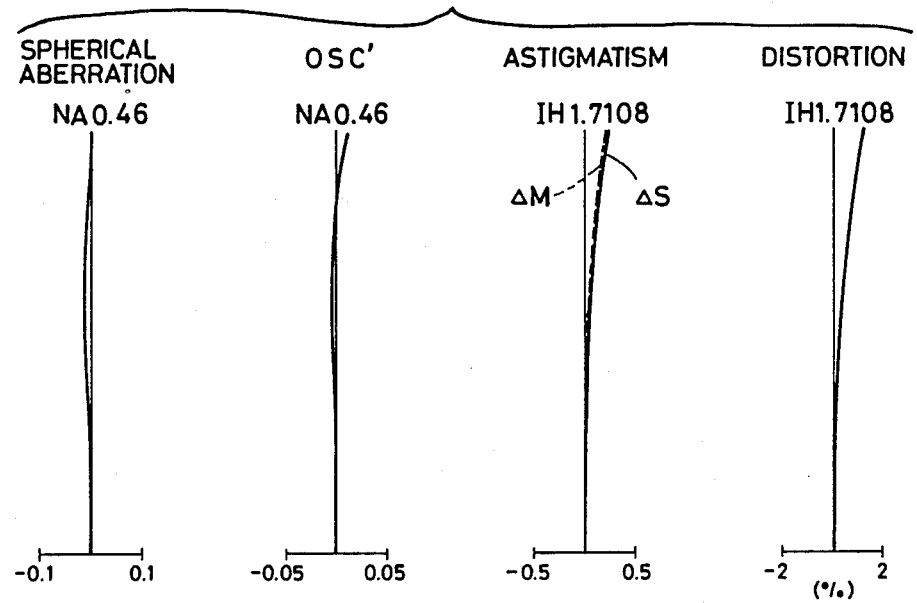
Figure 20:
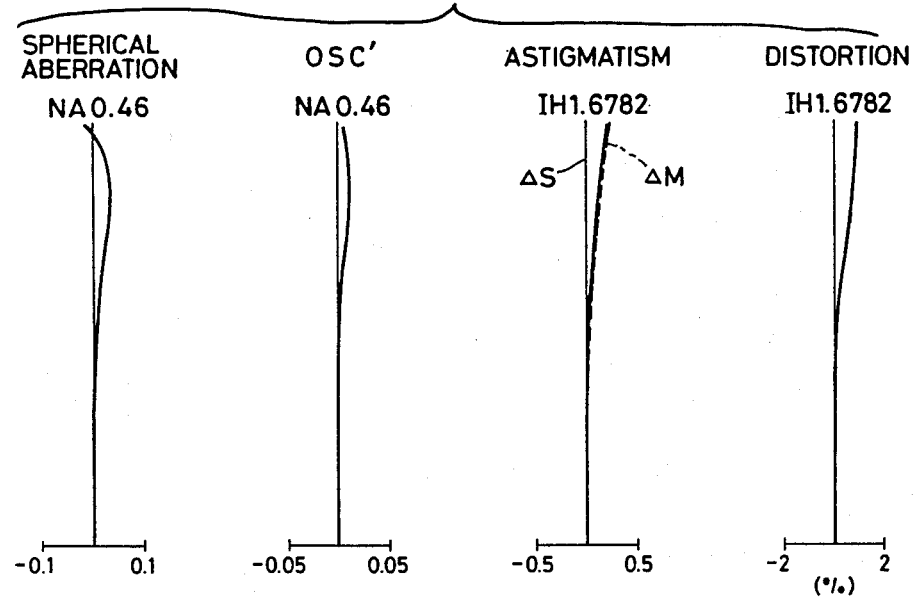
Figure 21:
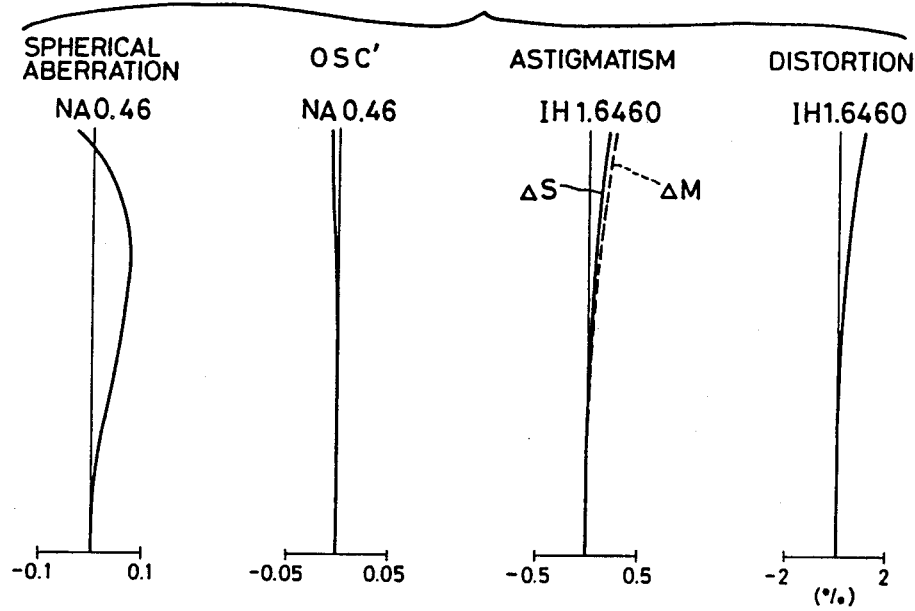
Figure 22:
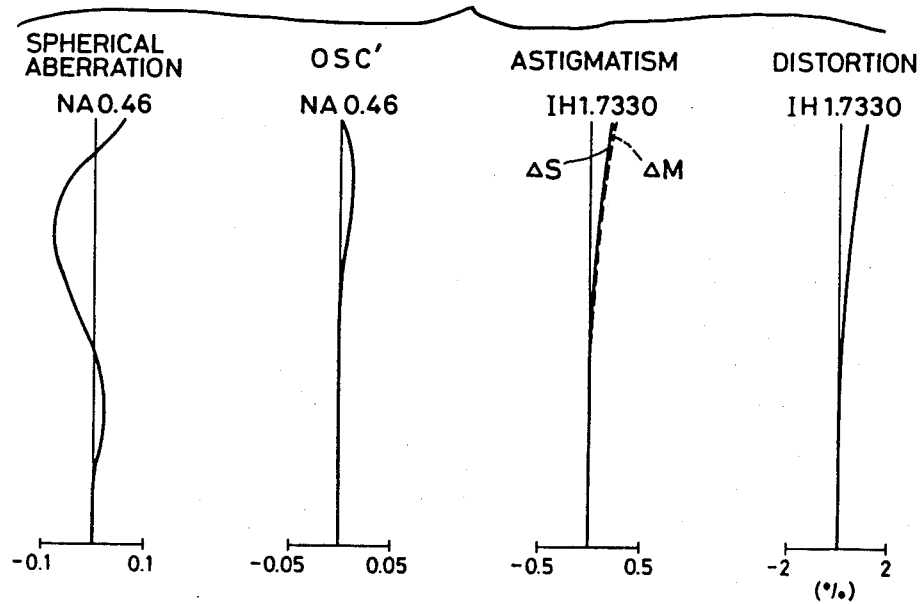
Figure 23:
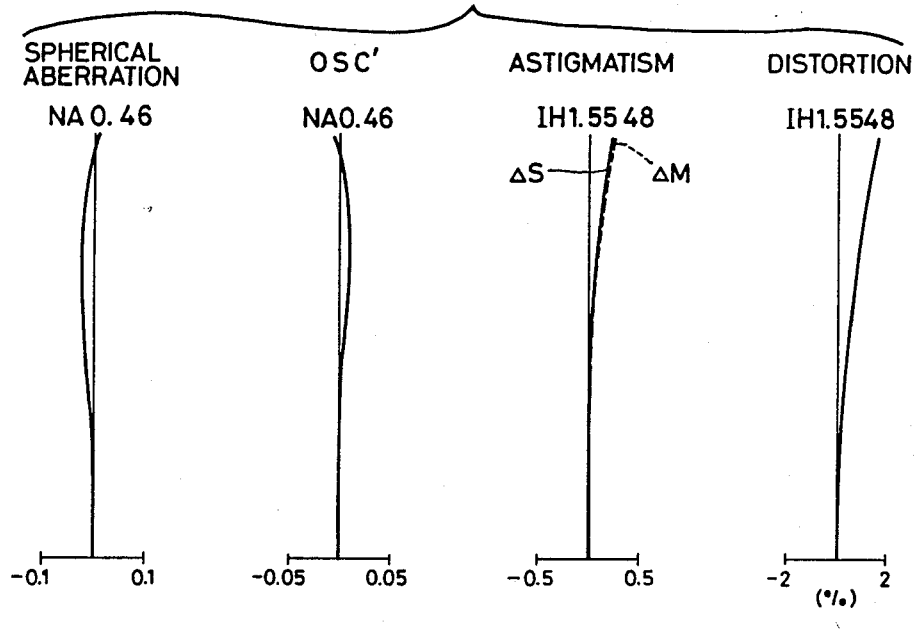
Figure 24:
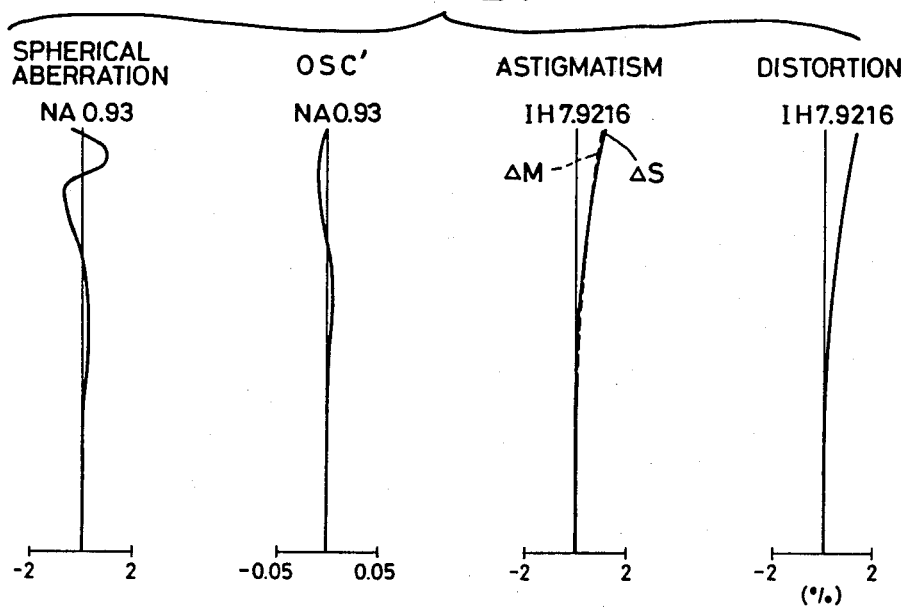
Figure 25:
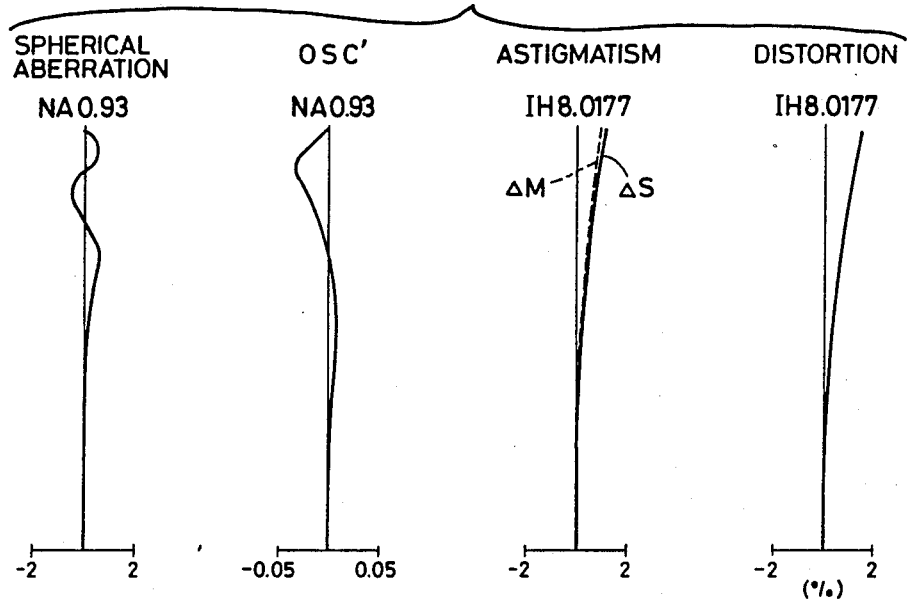
Figure 26:
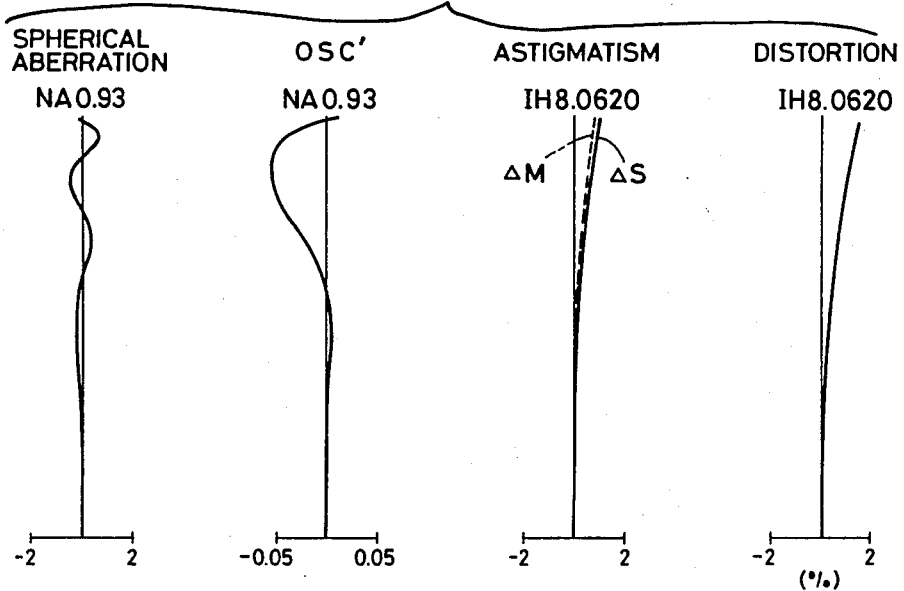

The embodiments described above have the compositions shown in FIG. 1 through FIG. 14 in which a single or plural radial GRIN lenses are arranged on either the front or rear side or both the sides of the intersection between the off-axial ray 1 and the optical axis.

Out of the embodiments described above, the Embodiments 1 through 7 and the Embodiments 10 through 14 comprise a meniscus lens component arranged on the extreme object side and having a plane surface on the object side, and has a front group of the nearly aplanatic composition. In the Embodiments 8 and 9, the lens component arranged on the extreme object side and having a plane surface on the object side is designed as a radial GRIN lens. In the Embodiment 9, the lens groups located nearer the object in the objective lens system have the Gauss Gauβ type of composition to obtain good flatness of the image surface.

As is explained above in detail and is evident from the preferred Embodiments, the present invention provides the microscope objective lens system which is simpler in construction and in which aberrations are corrected sufficiently to a wide range of NA.

I claim:

1. A microscope objective lens system comprising a plurality of lens elements or components which are arranged along a common optical axis, at least one of said lens elements or components being a graded refractive index lens, whose refractive index varies with the radial distance from said optical axis, and said graded refractive index lens being located on the object side of a point of intersection of an off-axial principal ray and said optical axis, wherein the refractive index distribution of said graded refractive index lens is expressed by the formula shown below, and said graded refractive index lens satisfies condition (1) shown below:

$$n = n_0 + n_1 r^2 + n_2 r^4 + n_3 r^6 + \ldots$$

$$|n_1| > 7 \times 10^{-4}/f^2 \quad (1)$$

$n_0$ represents the refractive index on the optical axis, r represents the radial distance from the optical axis, $n_1, n_2, n_3, \ldots$ respectively represent the 2nd-, 4th-, 6th-, ... order coefficients, and f represents the focal length of said objective lens system.

2. A microscope objective lens system according to claim 1, wherein a lens element located on the most object side is a meniscus lens having a concave surface facing the object side, and said lens element is a graded refractive index lens, whose refractive index varies with the radial distance from said optical axis.

3. A microscope objective lens system according to claim 2, wherein a first positive lens located on the image side of said meniscus lens; a second positive lens spaced apart from said first positive lens at a substantial distance; and a meniscius lens component, which has a concave surface facing the image side; are arranged in that order from the object side, said first positive lens being a graded refractive index lens, whose refractive index varies with the radial distance from said optical axis.

4. A microscope objective lens system according to claim 1, said graded refractive index lens further satisfying the condition (3) shown below:

$$|\bar{n}_1| > |\bar{n}_i|, i \geq 3 \quad (3)$$

where $\bar{n}_i = n_i/f^{2i}$.

5. A microscope objective lens system according to claim 1, wherein a lens element located on the most object side is a plano-convex lens having a plane surface on the object side, and said plano-convex lens is a graded refractive index lens whose refractive index varies with the radial distance from said optical axis.

6. A microscope objective lens system according to claim 5, wherein said plurality of lens elements or components include first and second positive lens components located on the image side of said plano-convex lens element, and third lens component having a concave surface facing the image side, said first and second positive lens components being spaced apart from said third lens component at a substantial distance, at least one of said first and second positive lens components being a graded refractive index lens, whose refractive index varies with the radial distance from said optical axis.

7. A microscope objective lens system according to claim 5, wherein said plurality of lens elements or components include a pair of lens components, the facing surfaces of which are both concave, on the image side of said plano-convex lens element, said pair of lens components including at least one graded refractive index lens, whose refractive index varies with the radial distance from said optical axis.

8. A microscope objective lens system according to claim 5, having the following data:

| | | |
|---|---|---|
| $r_1 = \infty$ | | |
| | $d_1 = 0.8889$ | $n_{01} = 1.63980^*$ |
| $r_2 = -7.4105$ | | |
| | $d_2 = 0.0131$ | |
| $r_3 = 1713.8486$ | | |
| | $d_3 = 0.2502$ | $n_{02} = 1.49700$ |
| $r_4 = -1.7788$ | | |
| | $d_4 = 0.5388$ | $n_{03} = 1.79952^*$ |
| $r_5 = -1.3234$ | | |
| | $d_5 = 0.0131$ | |
| $r_6 = 24.5284$ | | |
| | $d_6 = 0.4578$ | $n_{04} = 1.67000^*$ |
| $r_7 = -3.7949$ | | |
| | $d_7 = 1.9044$ | |
| $r_8 = 2.6069$ | | |
| | $d_8 = 0.6026$ | $n_{05} = 1.65830^*$ |
| $r_9 = \infty$ | | |
| | $d_9 = 0.6903$ | $n_{06} = 1.61293^*$ |
| $r_{10} = 0.6670$ | | |

| | $n_1$ | $n_2$ |
|---|---|---|
| the 1st lens | 0.56264 | $-0.51213$ |
| the 3rd lens | $-0.11046$ | $0.37325 \times 10^{-1}$ |
| the 4th lens | $-0.12854$ | $-0.73600 \times 10^{-1}$ |
| the 5th lens | $-0.25773$ | $-0.72271 \times 10^{-1}$ |
| the 6th lens | $0.16576 \times 10^{-2}$ | $-0.12224$ |

$f = 1$
$m = 20 \times$
$WD = 0.2427$
$NA = 0.46$ where $r_1, r_2, \ldots$ respectively represent the radii of curvature of respective lens surfaces, $d_1, d_2, \ldots$ respectively represent the thickness of respective lenses and the air-spaces between respective lenses, $n_{01}, n_{02}, \ldots$ respectively represent the refractive indices of respective lenses (or the refractive indices on the optical axis in the case of said graded refractive index lenses to which an asterisk * is attached), WD represents the working distance, m represents the magnification, and NA represents the numerical aperture.

9. A microscope objective lens system according to claims 1, 2 or 3, wherein a lens element on the most object side is a meniscus lens having a concave surface facing the object side, which has a uniform refractive index.

10. A microscope objective lens system according to claim 9, having the following data:

| | | |
|---|---|---|
| $r_1 = -0.6144$ | | |
| | $d_1 = 1.0054$ | $n_{01} = 1.78590^*$ |
| $r_2 = -0.9063$ | | |
| | $d_2 = 0.0129$ | |
| $r_3 = -11.8711$ | | |
| | $d_3 = 0.5453$ | $n_{02} = 1.76180^*$ |
| $r_4 = -1.9559$ | | |
| | $d_4 = 2.5506$ | |
| $r_5 = 14.2613$ | | |
| | $d_5 = 0.2171$ | $n_{03} = 1.49700$ |
| $r_6 = -2.8644$ | | |
| | $d_6 = 0.0129$ | |
| $r_7 = 2.5836$ | | |
| | $d_7 = 0.6761$ | $n_{04} = 1.65830$ |
| $r_8 = \infty$ | | |
| | $d_8 = 0.3728$ | $n_{05} = 1.61340$ |
| $r_9 = 1.1081$ | | |

| | $n_1$ | $n_2$ |
|---|---|---|
| the 1st lens | 0.16838 | $0.60574 \times 10^{-1}$ |
| the 2nd lens | $-0.13761$ | $-0.54513 \times 10^{-2}$ |

$f = 1$
$m = 20 \times$
$WD = 0.2456$
$NA = 0.46$ where $r_1, r_2, \ldots$ respectively represent the radii of curvature of respective lens surfaces, $d_1, d_2, \ldots$ respectively represent the thickness of respective lenses and the air-spaces between respective lenses, $n_{01}, n_{02}, \ldots$ respectively represent the refractive indices of respective lenses (or the refractive indices on the optical axis in the case of said graded refractive index lenses to which an asterisk * is attached), WD represents the working distance, m represents the magnification, and NA represents the numerical aperture.

11. A microscope objective lens system according to claim 9, having the following data:

| | | |
|---|---|---|
| $r_1 = -0.7070$ | | |
| | $d_1 = 1.0402$ | $n_{01} = 1.78590^*$ |
| $r_2 = -0.9457$ | | |
| | $d_2 = 0.0130$ | |
| $r_3 = -7.5963$ | | |
| | $d_3 = 0.5582$ | $n_{02} = 1.76180^*$ |
| $r_4 = -1.7635$ | | |
| | $d_4 = 2.2760$ | |
| $r_5 = 7.1126$ | | |
| | $d_5 = 0.4596$ | $n_{03} = 1.49700$ |
| $r_6 = -2.7181$ | | |
| | $d_6 = 0.0130$ | |
| $r_7 = 2.7615$ | | |
| | $d_7 = 1.1005$ | $n_{04} = 1.65830$ |
| $r_8 = 1.0582$ | | |

| | $n_1$ | $n_2$ |
|---|---|---|
| the 1st lens | 0.28629 | $0.10903$ |
| the 2nd lens | $-0.18390$ | $-0.78497 \times 10^{-2}$ |

$f = 1$
$m = 20 \times$
$WD = 0.2486$
$NA = 0.46$ where $r_1, r_2, \ldots$ respectively represent the radii of curvature of respective lens surfaces, $d_1, d_2, \ldots$ respectively represent the thickness of respective lenses and the air-spaces between respective lenses, $n_{01}, n_{02}, \ldots$ respectively represent the refractive indices of respective lenses (or the refractive indices on the optical axis in the case of said graded refractive index lenses to which an asterisk * is attached), WD represents the working distance, m represents the magnification, and NA represents the numerical aperture.

12. A microscope objective lens system according to claim 9, having the following data:

| $r_1 = -0.4538$ | | |
| --- | --- | --- |
| | $d_1 = 0.6875$ | $n_{01} = 1.83400$ |
| $r_2 = -0.7384$ | | |
| | $d_2 = 0.0128$ | |
| $r_3 = -2.2225$ | | |
| | $d_3 = 0.2726$ | $n_{02} = 1.49700$ |
| $r_4 = -1.1462$ | | |
| | $d_4 = 0.0128$ | |
| $r_5 = -50.2670$ | | |
| | $d_5 = 0.6930$ | $n_{03} = 1.76180$ |
| $r_6 = -3.5196$ | | |
| | $d_6 = 2.4305$ | |
| $r_7 = 3.5395$ | | |
| | $d_7 = 0.3499$ | $n_{04} = 1.49700$ |
| $r_8 = -4.1378$ | | |
| | $d_8 = 0.0128$ | |
| $r_9 = 1.9530$ | | |
| | $d_9 = 0.8743$ | $n_{05} = 1.65830*$ |
| $r_{10} = 0.9857$ | | |

| | $n_1$ | $n_2$ |
| --- | --- | --- |
| the 5th lens | $-0.14689 \times 10^{-2}$ | $-0.60052 \times 10^{-3}$ |

$f = 1$
$m = 20 \times$
$WD = 0.2434$
$NA = 0.46$ where $r_1, r_2, \ldots$ respectively represent the radii of curvature of respective lens surfaces, $d_1, d_2, \ldots$ respectively represent the thickness of respective lenses and the air-spaces between respective lenses, $n_{01}, n_{02}, \ldots$ respectively represent the refractive indices of respective lenses (or the refractive indices on the optical axis in the case of said graded refractive index lenses to which an asterisk * is attached), WD represents the working distance, m represents the magnification, and NA represents the numerical aperture.

13. A microscope objective lens system according to claim 9, having the following data:

| $r_1 = -0.4496$ | | |
| --- | --- | --- |
| | $d_1 = 0.6812$ | $n_{01} = 1.83400$ |
| $r_2 = -0.7511$ | | |
| | $d_2 = 0.0127$ | |
| $r_3 = -2.6794$ | | |
| | $d_3 = 0.2542$ | $n_{02} = 1.49700$ |
| $r_4 = -1.0686$ | | |
| | $d_4 = 0.0127$ | |
| $r_5 = -39.6904$ | | |
| | $d_5 = 0.6420$ | $n_{03} = 1.76180$ |
| $r_6 = -4.0568$ | | |
| | $d_6 = 2.4876$ | |
| $r_7 = 4.1051$ | | |
| | $d_7 = 0.3941$ | $n_{04} = 1.60178*$ |
| $r_8 = -4.6364$ | | |
| | $d_8 = 0.0127$ | |
| $r_9 = 1.9945$ | | |
| | $d_9 = 0.8333$ | $n_{05} = 1.66083*$ |
| $r_{10} = 0.9754$ | | |

| | $n_1$ | $n_2$ |
| --- | --- | --- |
| the 4th lens | $-0.36453 \times 10^{-1}$ | $0.98488 \times 10^{-2}$ |
| the 5th lens | $0.13955 \times 10^{-1}$ | $-0.25987 \times 10^{-1}$ |

$f = 1$
$m = 20 \times$
$WD = 0.2427$
$NA = 0.46$ where $r_1, r_2, \ldots$ respectively represent the radii of curvature of respective lens surfaces, $d_1, d_2, \ldots$ respectively represent the thickness of respective lenses and the air-spaces between respective lenses, $n_{01}, n_{02}, \ldots$ respectively represent the refractive indices of respective lenses (or the refractive indices on the optical axis in the case of said graded refractive index lenses to which an asterisk * is attached), WD represents the working distance, m represents the magnification, and NA represents the numerical aperture.

14. A microscope objective lens system according to claim 9, having the following data:

| $r_1 = -0.6202$ | | |
| --- | --- | --- |
| | $d_1 = 1.0101$ | $n_{01} = 1.78590*$ |
| $r_2 = -0.9334$ | | |
| | $d_2 = 0.0129$ | |
| $r_3 = -25.9860$ | | |
| | $d_3 = 0.5460$ | $n_{02} = 1.76180*$ |
| $r_4 = -1.8355$ | | |
| | $d_4 = 2.5837$ | |
| $r_5 = 17.0878$ | | |
| | $d_5 = 0.2177$ | $n_{03} = 1.49700$ |
| $r_6 = -2.8475$ | | |
| | $d_6 = 0.0129$ | |
| $r_7 = 2.3126$ | | |
| | $d_7 = 1.0278$ | $n_{04} = 1.65830*$ |
| $r_8 = 1.3126$ | | |

| | $n_1$ | $n_2$ |
| --- | --- | --- |
| the 1st lens | 0.20954 | $0.55868 \times 10^{-1}$ |
| the 2nd lens | $-0.12844$ | $0.81108 \times 10^{-2}$ |
| the 4th lens | $0.18233 \times 10^{-2}$ | $0.56092 \times 10^{-3}$ |

$f = 1$
$m = 20 \times$
$WD = 0.2464$
$NA = 0.46$ where $r_1, r_2, \ldots$ respectively represent the radii of curvature of respective lens surfaces, $d_1, d_2, \ldots$ respectively represent the thickness of respective lenses and the air-spaces between respective lenses, $n_{01}, n_{02}, \ldots$ respectively represent the refractive indices of respective lenses (or the refractive indices on the optical axis in the case of said graded refractive index lenses to which an asterisk * is attached), WD represents the working distance, m represents the magnification, and NA represents the numerical aperture.

15. A microscope objective lens system according to claim 9, having the following data:

| $r_1 = -0.6082$ | | |
| --- | --- | --- |
| | $d_1 = 0.9974$ | $n_{01} = 1.77250*$ |
| $r_2 = -0.9962$ | | |
| | $d_2 = 0.0127$ | |
| $r_3 = 4.5931$ | | |
| | $d_3 = 0.5346$ | $n_{02} = 1.77250*$ |
| $r_4 = -2.1599$ | | |
| | $d_4 = 2.6874$ | |
| $r_5 = 5.1919$ | | |
| | $d_5 = 1.0629$ | $n_{03} = 1.83400*$ |
| $r_6 = 1.5327$ | | |

| | $n_1$ | $n_2$ |
| --- | --- | --- |
| the 1st lens | 0.15622 | $0.27687 \times 10^{-1}$ |
| the 2nd lens | $-0.93618 \times 10^{-1}$ | $0.19220 \times 10^{-1}$ |
| the 3rd lens | $-0.16188$ | $0.32660 \times 10^{-1}$ |

$f = 1$
$m = 20 \times$
$WD = 0.2417$
$NA = 0.46$ where $r_1, r_2, \ldots$ respectively represent the radii of curvature of respective lens surfaces, $d_1, d_2, \ldots$ respectively represent the thickness of respective lenses and the air-spaces between respective lenses, $n_{01}, n_{02}, \ldots$ respectively represent the refractive indices of respective lenses (or the refractive indices on the optical axis in the case of said graded refractive index lenses to which an asterisk * is attached), WD represents the working distance, m represents the magnification, and NA represents the numerical aperture.

16. A microscope objective lens system according to claim 9, having the following data:

| | | |
|---|---|---|
| $r_1 = -0.5249$ | | |
| | $d_1 = 0.9910$ | $n_{01} = 1.77250$ |
| $r_2 = -1.0014$ | | |
| | $d_2 = 0.0124$ | |
| $r_3 = 4.7627$ | | |
| | $d_3 = 0.5335$ | $n_{02} = 1.77250*$ |
| $r_4 = -2.2014$ | | |
| | $d_4 = 2.6257$ | |
| $r_5 = -23.3838$ | | |
| | $d_5 = 1.0309$ | $n_{03} = 1.83400*$ |
| $r_6 = 3.3579$ | | |

| | $n_1$ | $n_2$ |
|---|---|---|
| the 2nd lens | $-0.55298 \times 10^{-1}$ | $-0.63272 \times 10^{-2}$ |
| the 3rd lens | $-0.13406$ | $0.43943 \times 10^{-1}$ |

| | |
|---|---|
| $f = 1$ | $WD = 0.2371$ |
| $m = 20 \times$ | $NA = 0.46$ | where $r_1, r_2, \ldots$ respectively represent the radii of curvature of respective lens surfaces, $d_1, d_2, \ldots$ respectively represent the thickness of respective lenses and the air-spaces between respective lenses, $n_{01}, n_{02}, \ldots$ respectively represent the refractive indices of respective lenses (or the refractive indices on the optical axis in the case of said graded refractive index lenses to which an asterisk * is attached), WD represents the working distance, m represents the magnification, and NA represents the numerical aperture.

17. A microscope objective lens system according to claim 9, having the following data:

| | | |
|---|---|---|
| $r_1 = -0.8938$ | | |
| | $d_1 = 1.3014$ | $n_{01} = 1.60311*$ |
| $r_2 = -1.0761$ | | |
| | $d_2 = 0.0485$ | |
| $r_3 = -12.5422$ | | |
| | $d_3 = 1.2779$ | $n_{02} = 1.49700*$ |
| $r_4 = -2.1073$ | | |
| | $d_4 = 0.1196$ | |
| $r_5 = -5.9203$ | | |
| | $d_5 = 4.0147$ | $n_{03} = 1.65830*$ |
| $r_6 = -15.8260$ | | |
| | $d_6 = 2.4285$ | |
| $r_7 = 50.5226$ | | |
| | $d_7 = 1.2080$ | $n_{04} = 1.69680$ |
| $r_8 = -45.6551$ | | |
| | $d_8 = 0.8486$ | |
| $r_9 = 8.8504$ | | |
| | $d_9 = 3.9661$ | $n_{05} = 1.64769*$ |
| $r_{10} = 8.1084$ | | |
| | $d_{10} = 0.0901$ | |
| $r_{11} = 5.3751$ | | |
| | $d_{11} = 3.3167$ | $n_{06} = 1.69680*$ |
| $r_{12} = 1.8122$ | | |

| | $n_1$ | $n_2$ |
|---|---|---|
| the 1st lens | $-0.55383 \times 10^{-1}$ | $0.75335 \times 10^{-2}$ |
| the 2nd lens | $0.36158 \times 10^{-2}$ | $-0.67351 \times 10^{-2}$ |
| the 3rd lens | $-0.48852 \times 10^{-2}$ | $0.55867 \times 10^{-3}$ |
| the 5th lens | $-0.91403 \times 10^{-2}$ | $0.61851 \times 10^{-4}$ |
| the 6th lens | $0.29971 \times 10^{-2}$ | $-0.79363 \times 10^{-3}$ |

| | |
|---|---|
| $f = 1$ | $WD = 0.2747$ |
| $m = 100 \times$ | $NA = 0.93$ | where $r_1, r_2, \ldots$ respectively represent the radii of curvature of respective lens surfaces, $d_1, d_2, \ldots$ respectively represent the thickness of respective lenses and the air-spaces between respective lenses, $n_{01}, n_{02}, \ldots$ respectively represent the refractive indices of respective lenses (or the refractive indices on the optical axis in the case of said graded refractive index lenses to which an asterisk * is attached), WD represents the working distance, m represents the magnification, and NA represents the numerical aperture.

18. A microscope objective lens system according to claim 9, having the following data:

| | | |
|---|---|---|
| $r_1 = -0.9046$ | | |
| | $d_1 = 1.3174$ | $n_{01} = 1.60311*$ |
| $r_2 = -1.0892$ | | |
| | $d_2 = 0.0490$ | |
| $r_3 = -14.5015$ | | |
| | $d_3 = 1.2957$ | $n_{02} = 1.49700*$ |
| $r_4 = -2.1711$ | | |
| | $d_4 = 0.1210$ | |
| $r_5 = -9.4617$ | | |
| | $d_5 = 4.1552$ | $n_{03} = 1.65830*$ |
| $r_6 = -74.3330$ | | |
| | $d_6 = 2.6622$ | |
| $r_7 = 14.4729$ | | |
| | $d_7 = 1.2227$ | $n_{04} = 1.69680$ |
| $r_8 = 76.2347$ | | |
| | $d_8 = 1.4766$ | |
| $r_9 = 7.4458$ | | |
| | $d_9 = 4.4476$ | $n_{05} = 1.64769*$ |
| $r_{10} = 5.3166$ | | |
| | $d_{10} = 0.0912$ | |
| $r_{11} = 4.1294$ | | |
| | $d_{11} = 3.4526$ | $n_{06} = 1.69680$ |
| $r_{12} = 1.8342$ | | |

| | $n_1$ | $n_2$ |
|---|---|---|
| the 1st lens | $-0.44747 \times 10^{-1}$ | $0.62120 \times 10^{-2}$ |
| the 2nd lens | $0.46213 \times 10^{-2}$ | $-0.63046 \times 10^{-2}$ |
| the 3rd lens | $-0.37359 \times 10^{-2}$ | $0.78555 \times 10^{-3}$ |
| the 5th lens | $-0.52911 \times 10^{-2}$ | $-0.54567 \times 10^{-4}$ |

| | |
|---|---|
| $f = 1$ | $WD = 0.2780$ |
| $m = 100 \times$ | $NA = 0.93$ | where $r_1, r_2, \ldots$ respectively represent the radii of curvature of respective lens surfaces, $d_1, d_2, \ldots$ respectively represent the thickness of respective lenses and the air-spaces between respective lenses, $n_{01}, n_{02}, \ldots$ respectively represent the refractive indices of respective lenses (or the refractive indices on the optical axis in the case of said graded refractive index lenses to which an asterisk * is attached), WD represents the working distance, m represents the magnification, and NA represents the numerical aperture.

19. A microscope objective lens system according to claim 9, having the following data:

| | | |
|---|---|---|
| $r_1 = -0.9096$ | | |
| | $d_1 = 1.3245$ | $n_{01} = 1.60075*$ |
| $r_2 = -1.0952$ | | |
| | $d_2 = 0.0493$ | |
| $r_3 = -14.1908$ | | |
| | $d_3 = 1.3024$ | $n_{02} = 1.49816*$ |
| $r_4 = -2.1963$ | | |
| | $d_4 = 0.1217$ | |
| $r_5 = -10.1842$ | | |
| | $d_5 = 4.1444$ | $n_{03} = 1.80715*$ |
| $r_6 = -39.8009$ | | |
| | $d_6 = 6.9678$ | |
| $r_7 = 6.1099$ | | |
| | $d_7 = 4.0578$ | $n_{04} = 1.69783*$ |
| $r_8 = 8.5336$ | | |
| | $d_8 = 3.4046$ | $n_{05} = 1.72825$ |
| $r_9 = 2.0713$ | | |

| | $n_1$ | $n_2$ |
|---|---|---|
| the 1st lens | $-0.45357 \times 10^{-1}$ | $0.60265 \times 10^{-2}$ |
| the 2nd lens | $0.45552 \times 10^{-2}$ | $-0.58051 \times 10^{-2}$ |
| the 3rd lens | $-0.78030 \times 10^{-2}$ | $0.68623 \times 10^{-3}$ |

-continued

| | | |
|---|---|---|
| the 4th lens | $-0.69381 \times 10^{-2}$ | $-0.72030 \times 10^{-4}$ |

| | |
|---|---|
| $f = 1$ | $WD = 0.2795$ |
| $m = 100 \times$ | $NA = 0.93$ | where $r_1, r_2, \ldots$ respectively represent the radii of curvature of respective lens surfaces, $d_1, d_2, \ldots$ respectively represent the thickness of respective lenses and the air-spaces between respective lenses, $n_{01}, n_{02}, \ldots$ respectively represent the refractive indices of respective lenses (or the refractive indices on the optical axis in the case of said graded refractive index lenses to which an asterisk * is attached), WD represents the working distance, m represents the magnification, and NA represents the numerical aperture.

20. A microscope objective lens system according to claim 9, having the following data:

| | | |
|---|---|---|
| $r_1 = -0.9102$ | | |
| | $d_1 = 1.3253$ | $n_{01} = 1.60023*$ |
| $r_2 = -1.0959$ | | |
| | $d_2 = 0.0493$ | |
| $r_3 = -14.9113$ | | |
| | $d_3 = 1.3034$ | $n_{02} = 1.49944*$ |
| $r_4 = -2.2018$ | | |
| | $d_4 = 0.1218$ | |
| $r_5 = -9.1663$ | | |
| | $d_5 = 4.2035$ | $n_{03} = 1.85239*$ |
| $r_6 = -30.0889$ | | |
| | $d_6 = 6.8824$ | |
| $r_7 = 5.4337$ | | |
| | $d_7 = 4.0753$ | $n_{04} = 1.53018*$ |
| $r_8 = 5.8757$ | | |
| | $d_8 = 3.4069$ | $n_{05} = 1.72825$ |
| $r_9 = 1.9552$ | | |

| | $n_1$ | $n_2$ |
|---|---|---|
| the 1st lens | $-0.43188 \times 10^{-1}$ | $0.56817 \times 10^{-2}$ |
| the 2nd lens | $0.49284 \times 10^{-2}$ | $-0.58945 \times 10^{-2}$ |
| the 3rd lens | $-0.82238 \times 10^{-2}$ | $0.69973 \times 10^{-3}$ |
| the 4th lens | $-0.69388 \times 10^{-2}$ | $-0.79032 \times 10^{-4}$ |

| | |
|---|---|
| $f = 1$ | $WD = 0.2797$ |
| $m = 100 \times$ | $NA = 0.93$ | where $r_1, r_2, \ldots$ respectively represent the radii of curvature of respective lens surfaces, $d_1, d_2, \ldots$ respectively represent the thickness of respective lenses and the air-spaces between respective lenses, $n_{01}, n_{02}, \ldots$ respectively represent the refractive indices of respective lenses (or the refractive indices on the optical axis in the case of said graded refractive index lenses to which an asterisk * is attached), WD represents the working distance, m represents the magnification, and NA represents the numerical aperture.

21. A microscope objective lens system according to claim 9, having the following data:

| | | |
|---|---|---|
| $r_1 = -1.0065$ | | |
| | $d_1 = 1.2888$ | $n_{01} = 1.70154$ |
| $r_2 = -1.1460$ | | |
| | $d_2 = 0.0480$ | |
| $r_3 = 42.7198$ | | |
| | $d_3 = 1.2684$ | $n_{02} = 1.49944*$ |
| $r_4 = -2.2385$ | | |
| | $d_4 = 0.1186$ | |
| $r_5 = -7.2241$ | | |
| | $d_5 = 4.1668$ | $n_{03} = 1.85239*$ |
| $r_6 = -21.1737$ | | |
| | $d_6 = 3.4460$ | |
| $r_7 = 4.2290$ | | |
| | $d_7 = 3.9676$ | $n_{04} = 1.53018*$ |
| $r_8 = -11.4298$ | | |
| | $d_8 = 3.3015$ | $n_{05} = 1.57309$ |

-continued

| | |
|---|---|
| $r_9 = 1.6647$ | |

| | $n_1$ | $n_2$ |
|---|---|---|
| the 2nd lens | $-0.24757 \times 10^{-2}$ | $-0.52109 \times 10^{-2}$ |
| the 3rd lens | $-0.51876 \times 10^{-2}$ | $0.11213 \times 10^{-2}$ |
| the 4th lens | $-0.78173 \times 10^{-2}$ | $-0.25718 \times 10^{-3}$ |

| | |
|---|---|
| $f = 1$ | $WD = 0.2724$ |
| $m = 100 \times$ | $NA = 0.93$ | where $r_1, r_2, \ldots$ respectively represent the radii of curvature of respective lens surfaces, $d_1, d_2, \ldots$ respectively represent the thickness of respective lenses and the air-spaces between respective lenses, $n_{01}, n_{02}, \ldots$ respectively represent the refractive indices of respective lenses (or the refractive indices on the optical axis in the case of said graded refractive index lenses to which an asterisk * is attached), WD represents the working distance, m represents the magnification, and NA represents the numerical aperture.

22. A microscope objective lens system according to claim 9, including a first positive lens component, second positive lens component, and a third lens component having a concave surface facing the image side, in that order, at the rear of said meniscus lens, said first positive lens component being spaced apart from said second positive lens component at a substantial distance, and each of said meniscus lens and said first positive lens component being a graded refractive index lens, whose refractive index varies with the radial distance from the optical axis.

23. A microscope objective lens system according to claim 22, wherein said third lens component, which has a concave surface facing the image side, is a graded refractive index lens, whose refractive index varies with the radial distance from the optical axis.

24. A microscope objective lens system according to claim 9, including a first positive lens component and second lens component having a concave surface facing the image side, in that order, at the rear of said meniscus lens, said first positive lens component being spaced apart from said second lens component at a substantial distance and both said first positive lens component and said second lens component being a graded refractive index lens, whose refractive index vary with the radial distance from the optical axis.

25. A microscope objective lens system according to claim 24, wherein said meniscus lens is a graded refractive index lens, whose refractive index varies with the radial distance from the optical axis.

26. A microscope objective lens system according to claim 9, including first and second lens components and third lens component having a concave surface facing the image side, in that order, at the rear of said meniscus lens, said second lens component being spaced apart from said third lens component at a substantial distance at least one of these lens components being a graded refractive index lens, whose refractive index varies with the radial distance form the optical axis.

27. A microscope objective lens system according to claim 26, wherein said meniscus lens is a graded refractive index lens, whose refractive index varies with the radial distance from the optical axis.

28. A microscope objective lens system according to claim 27, wherein said third lens component is a cemented doublet.

29. A microscope objective lens system according to claim 27, wherein said third lens component consists of two lens elements separated from each other.

30. A microscope objective lens system according to claim 27, wherein a fourth lens component is arranged between said second lens component and said third lens component.

31. A microscope objective lens system according to claim 30 wherein said third lens component is a cemented doublet.

32. A microscope objective lens system according to claim 30 wherein said third lens component consists of two lens elements separated from each other.

33. A microscope objective lens system comprising a plurality of lens elements or components which are arranged along a common optical axis, at least one of said lens elements or components being a graded refractive index lens, whose refractive index varies with the radial distance from the optical axis, and said graded refractive index lens being located on the image side of a point of intersection of an off-axial principal ray and said optical axis, wherein the refractive index distribution of said graded refractive index lens is expressed by the formula shown below and said graded refractive index lens satisfies the condition (2) shown below.

$$n = n_0 + n_1 r^2 + n_2 r^4 + n_3 r^6 + \ldots$$

$$|n_1| > 7 \times 10^{-4}/f^2 \qquad (2)$$

where $n_0$ represents the refractive index on the optical axis, r represents the radial distance from the optical axis, $n_1, n_2, n_3, \ldots$ respectively represent the 2nd-, 4th-, 6th-, $\ldots$ order coefficients, and f represents the focal length of said objective lens system.

34. A microscope objective lens system according to claim 33, wherein a lens component located on the most image side has a concave surface facing the image side, and said lens component comprises at least one graded refractive index lens, whose refractive index varies with the radial distance from said optical axis.

35. A microscope objective lens system according to claim 34, wherein a meniscus lens component having a concave surface facing the object side, and first, second and third, positive lenses are located in that order on the object side, said second positive lens being spaced apart from said third positive lens at a distance.

36. A microscope objective lens system according to claim 35 wherein said third positive lens is a graded refractive index lens, whose refractive index varies with the radial distance from said optical axis.

37. A microscope objective lens system according to claim 33, said graded refractive index lens further satisfying the condition (3) shown below:

$$|\bar{n}_1| > |\bar{n}_i|, i \geqq 3 \qquad (3)$$

where $\bar{n}_i = n_i/f^{2i}$.

38. A microscope objective lens system comprising a plurality of lens elements or components which are arranged along a common optical axis, at least two of said lens elements or components being graded refractive index lenses whose refractive index vary with the radial distance from the optical axis, at least one of said graded refractive index lenses being located on the object side of a point of intersection of an off-axial principal ray and said optical axis, and the remaining graded refractive index lenses being located on the image side of said point, wherein the refractive index distribution of said graded refractive index lenses is expressed by the formula shown below, said graded refractive index lens on the object side of said point satisfies the condition (1) shown below, and said graded refractive index lens on the image side of said point satisfies the condition (2) shown below:

$$n = n_0 + n_1 r^2 + n_2 r^4 + n_3 r^6 + \ldots$$

$$|n_1| > 7 \times 10^{-4}/f^2 \qquad (1)$$

$$|n_1| > 1 \times 10^{-4}/f^2 \qquad (2)$$

$n_0$ represents the refractive index on the optical axis, r represents the radical distance from the optical axis, $n_1, n_2, n_3, \ldots$ respectively represent the 2nd-, 4th-, 6th-, $\ldots$ order coefficients, and f represents the focal length of said objective lens system.

39. A microscope objective lens system according to claim 38, wherein said plurality of lens elements or components include a foremost meniscus lens element located on the most object side, said meniscus lens element having a concave surface facing the object side, and a rearmost lens component located on the most image side, said lens component having a concave surface facing the image side, and said meniscus lens element being a graded refractive index lens, whose refractive index varies with the radial distance from said optical axis.

40. A microscope objective lens system according to claim 39, further including a positive lens, and a thick lens having a concave surface facing the object side said rearmost lens components consisting of two lens elements, said thick lens and either of said two lens elements of said rearmost lens component being graded refractive index lenses, whose refractive indices vary with the radial distances from the optical axis.

41. A microscope objective lens system according to claim 40, wherein another lens component is located between said thick lens and said rearmost lens component.

42. A microscope objective lens system according to claim 41, wherein both of said two lens elements of said rearmost lens component are graded refractive index lenses, whose refractive indices vary with the radial distances from the optical axis.

43. A microscope objective lens system according to claim 38, wherein said plurality of lens elements or components include a meniscus lens element located on the most object side, said meniscus lens element having a concave surface facing the object side, and a rearmost lens component located on the most image side, said rearmost lens component having a concave surface facing the image side, and said rearmost lens component including at least one graded refractive index lens, whose refractive index varies with the radial distance from said optical axis.

44. A microscope objective lens system according to claim 43, wherein a first positive lens element is located on the image side of said meniscus lens element, said positive lens element being a graded refractive index lens, whose refractive index varies with the radial distance from the optical axis.

45. A microscope objective lens system according to claim 44, wherein a second lens element is located on the image side of said first positive lens element, and has a concave surface facing the object side, said second lens element being a graded refractive index lens, whose refractive index varies with the radial distance from the optical axis.

46. A microscope objective lens system according to claim 38, wherein said plurality of lens elements or components include a meniscus lens element located on the most object side, said meniscus lens element having a concave surface facing the object side, and a rearmost lens component located on the most image side, said rearmost lens component having a concave surface facing the image side, said meniscus lens element being a graded refractive index lens, and said rearmost lens component including at least one graded refractive index lenses, the refractive index of each of said graded refractive index lenses varying with the radial distances from said optical axis.

47. A microscope objective lens system according to claim 46, wherein a first positive lens is located on the image side of said meniscus lens element, said first positive lens being a graded refractive index lens, whose refractive index varies with the radial distance from said optical axis.

48. A microscope objective lens system according to claim 47, wherein a second positive lens is located on the object side of said rearmost lens component.

49. A microscope objective lens system according to claim 38, said graded refractive index lens further satisfying the condition (3) shown below:

$$|\bar{n}_1| > |\bar{n}_i|, i \geq 3 \tag{3}$$

where $\bar{n}_i = n_i / f^{2i}$.

50. A microscope objective lens system according to claim 38, having the following data:

| | | |
|---|---|---|
| $r_1 = \infty$ | $d_1 = 0.5027$ | $n_{01} = 1.83400^*$ |
| $r_2 = -0.7363$ | $d_2 = 0.0125$ | |
| $r_3 = 0.5038$ | $d_3 = 0.2311$ | $n_{02} = 1.49700$ |
| $r_4 = \infty$ | $d_4 = 0.1868$ | $n_{03} = 1.74000^*$ |
| $r_5 = 0.3873$ | $d_5 = 0.2353$ | |
| $r_6 = -0.3567$ | $d_6 = 0.1005$ | $n_{04} = 1.67270^*$ |
| $r_7 = \infty$ | $d_7 = 0.4094$ | $n_{05} = 1.49700^*$ |
| $r_8 = -0.7164$ | $d_8 = 0.0184$ | |
| $r_9 = 4.7830$ | $d_9 = 0.3580$ | $n_{06} = 1.66755^*$ |
| $r_{10} = -1.2326$ | $d_{10} = 1.5374$ | |
| $r_{11} = 1.0611$ | $d_{11} = 0.6214$ | $n_{07} = 1.54869$ |
| $r_{12} = 0.7628$ | | |

| | $n_1$ | $n_2$ |
|---|---|---|
| the 1st lens | $-0.24460$ | $-0.25363$ |
| the 3rd lens | $0.36245 \times 10^{-1}$ | $0.48691$ |
| the 4th lens | $0.92425 \times 10^{-1}$ | $0.63217$ |
| the 5th lens | $0.10171$ | $0.75023 \times 10^{-1}$ |
| the 6th lens | $-0.58875 \times 10^{-1}$ | $-0.22649 \times 10^{-2}$ |

| | |
|---|---|
| $f = 1$ | $WD = 0.4513$ |
| $m = 20 \times$ | $NA = 0.46$ | where $r_1, r_2, \ldots$ respectively represent the radii of curvature of respective lens surfaces, $d_1, d_2, \ldots$ respectively represent the thickness of respective lenses and the air-spaces between respective lenses, $n_{01}, n_{02}, \ldots$ respectively represent the refractive indices of respective lenses (or the refractive indices on the optical axis in the case of said graded refractive index lenses to which an asterisk * is attached), WD represents the working distance, m represents the magnification, and NA represents the numerical aperture.

* * * * *